(12) United States Patent
Vasseur et al.

(10) Patent No.: US 10,003,511 B2
(45) Date of Patent: Jun. 19, 2018

(54) MITIGATING REFLECTION-BASED NETWORK ATTACKS

(71) Applicant: Cisco Technology, Inc., San Jose, CA (US)

(72) Inventors: Jean-Philippe Vasseur, Saint Martin D'uriage (FR); Sukrit Dasgupta, Norwood, MA (US)

(73) Assignee: Cisco Technology, Inc., San Jose, CA (US)

( * ) Notice: Subject to any disclaimer, the term of this patent is extended or adjusted under 35 U.S.C. 154(b) by 0 days. days.

(21) Appl. No.: 15/711,521

(22) Filed: Sep. 21, 2017

(65) Prior Publication Data

US 2018/0041409 A1 Feb. 8, 2018

Related U.S. Application Data

(63) Continuation of application No. 14/336,106, filed on Jul. 21, 2014, now Pat. No. 9,813,314.

(51) Int. Cl.
| | |
|---|---|
| *H04J 1/16* | (2006.01) |
| *H04L 12/26* | (2006.01) |
| *H04L 29/06* | (2006.01) |
| *H04L 12/28* | (2006.01) |

(52) U.S. Cl.
CPC ........ *H04L 43/062* (2013.01); *H04L 12/2854* (2013.01); *H04L 63/00* (2013.01)

(58) Field of Classification Search
CPC .... H04L 43/062; H04L 12/2854; H04L 63/00
USPC ....................................................... 370/252
See application file for complete search history.

(56) References Cited

U.S. PATENT DOCUMENTS

| | | | | |
|---|---|---|---|---|
| 7,971,253 B1* | 6/2011 | Gupta | ................. | H04L 63/1416 726/11 |
| 8,374,102 B2* | 2/2013 | Luft | .................... | H04L 41/5067 370/253 |
| 8,665,900 B2 | 3/2014 | Rabie et al. | | |
| 2007/0121596 A1* | 5/2007 | Kurapati | ........... | H04L 29/06027 370/356 |
| 2007/0256127 A1* | 11/2007 | Kraemer | ............... | G06F 21/552 726/23 |
| 2008/0031145 A1* | 2/2008 | Ethier | ............... | H04L 29/06027 370/248 |
| 2015/0295801 A1* | 10/2015 | Vega | ................... | H04L 43/0852 370/252 |

OTHER PUBLICATIONS

DocWiki; Cisco Performance Overview (PfR); http://docwiki.cisco.com/wiki/PfR: Technology_Overview; Apr. 24, 2014, pp. 1-35.
LiveAction, Simplifying the Network, "LiveAction for Cisco Intelligent WAN Management, Solution Design Guide", Jul. 2014, pp. 1-26.

* cited by examiner

*Primary Examiner* — Peter Cheng
(74) *Attorney, Agent, or Firm* — Parker Ibrahim & Berg LLP; James M. Behmke; Stephen D. LeBarron

(57) ABSTRACT

In one embodiment, a network device routes traffic along a network path and receives a performance threshold crossing alert regarding performance of the network path. The network device detects that the performance threshold crossing alert is part of a potential network attack by analyzing, by the device, the performance threshold crossing alert. The network device also provides a notification of the detected network attack.

10 Claims, 17 Drawing Sheets

US 10,003,511 B2

MITIGATING REFLECTION-BASED NETWORK ATTACKS

RELATED APPLICATION

The present application is a Continuation Application of U.S. patent application Ser. No. 14/336,106, filed Jul. 21, 2014, entitled MITIGATING REFLECTION-BASED NETWORK ATTACKS, by Jean-Philippe Vasseur et al., the contents of which is hereby incorporated by reference.

TECHNICAL FIELD

The present disclosure relates generally to computer networks, and, more particularly, to mitigating reflection-based attacks in a network.

BACKGROUND

Enterprise networks are carrying a very fast growing volume of both business and non-business critical traffics. Often, business applications such as video collaboration, cloud applications, etc., use the same hypertext transfer protocol (HTTP) and/or HTTP secure (HTTPS) techniques that are used by non-business critical web traffic. This complicates the task of optimizing network performance for specific applications, as many applications use the same protocols, thus making it difficult to distinguish and select traffic flows for optimization.

As the number of business and non-business critical applications increases, so too are the number and variety of service level agreements (SLAs) that may be in use by a network. In general, an SLA refers to a target or threshold level of performance guaranteed by the network, and may be associated with a particular type of traffic. For example, many real-time business applications are very bandwidth demanding and having corresponding SLAs that are used to ensure that a certain amount of network bandwidth is available for a particular flow of traffic.

In some cases, selection of a communication path for a traffic flow in an enterprise network may be performed dynamically based on threshold crossing alerts (TCAs) sent within the network. In general, a TCA may be generated whenever a network characteristic crosses a predefined threshold (e.g., a threshold value set by a network administrator). For example, a TCA may be generated whenever the delay or jitter along a path exceeds a threshold amount. Traffic switches between available paths may then take place, in response to receiving a TCA originated by the destination side of the path.

BRIEF DESCRIPTION OF THE DRAWINGS

The embodiments herein may be better understood by referring to the following description in conjunction with the accompanying drawings in which like reference numerals indicate identically or functionally similar elements, of which.

DESCRIPTION OF EXAMPLE EMBODIMENTS

Overview

According to one or more embodiments of the disclosure, a network device routes traffic along a network path and receives a performance threshold crossing alert regarding performance of the network path. The network device detects that the performance threshold crossing alert is part of a potential network attack by analyzing, by the device, the performance threshold crossing alert. The network device also provides a notification of the detected network attack.

Description

A computer network is a geographically distributed collection of nodes interconnected by communication links and segments for transporting data between end nodes, such as personal computers and workstations. Many types of networks are available, with the types ranging from local area networks (LANs) to wide area networks (WANs). LANs typically connect the nodes over dedicated private communications links located in the same general physical location, such as a building or campus. WANs, on the other hand, typically connect geographically dispersed nodes over long-distance communications links, such as common carrier telephone lines, optical lightpaths, synchronous optical networks (SONET), or synchronous digital hierarchy (SDH) links. The Internet is an example of a WAN that connects disparate networks throughout the world, providing global communication between nodes on various networks. The nodes typically communicate over the network by exchanging discrete frames or packets of data according to predefined protocols, such as the Transmission Control Protocol/Internet Protocol (TCP/IP). In this context, a protocol consists of a set of rules defining how the nodes interact with each other. Computer networks may be further interconnected by an intermediate network node, such as a router, to extend the effective "size" of each network.

Figure 1:
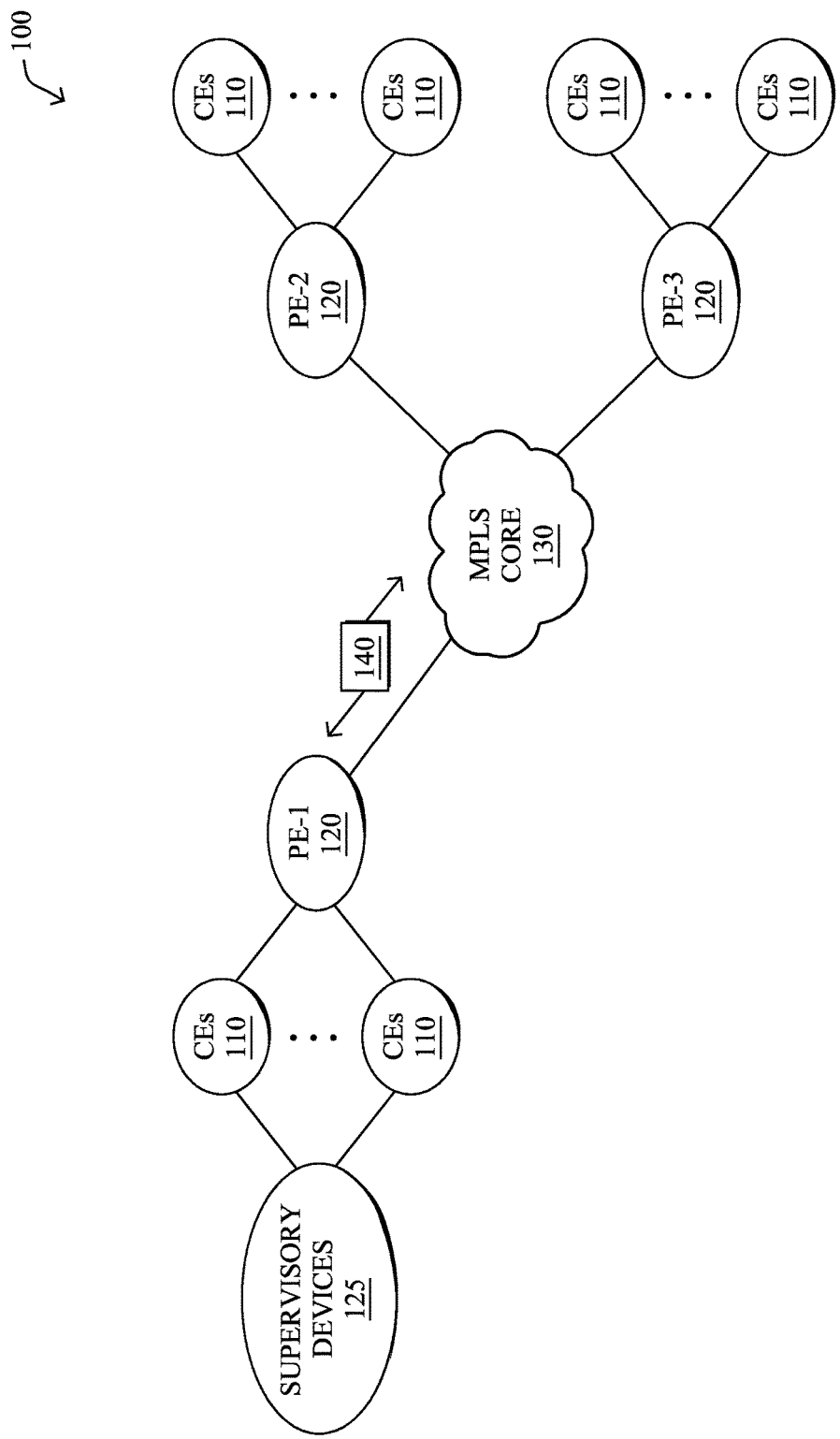
FIG. 1 illustrates an example communication network.

FIG. 1 is a schematic block diagram of an example computer network 100 illustratively comprising nodes/devices, such as a plurality of routers/devices interconnected by links or networks, as shown. For example, customer edge (CE) routers 110 may be interconnected with provider edge (PE) routers 120 (e.g., PE-1, PE-2, and PE-3) in order to communicate across a core network, such as an illustrative Multi-Protocol Label Switching (MPLS) core network 130. Alternatively, or in addition to, routers 110, 120 may be interconnected across a public Internet network. Data packets 140 (e.g., traffic/messages) may be exchanged among the nodes/devices of the computer network 100 over links using predefined network communication protocols such as the Transmission Control Protocol/Internet Protocol (TCP/IP), User Datagram Protocol (UDP), Asynchronous Transfer Mode (ATM) protocol, Frame Relay protocol, or any other suitable protocol. Those skilled in the art will understand that any number of nodes, devices, links, etc. may be used in the computer network, and that the view shown herein is for simplicity.

In some implementations, a router (or a set of routers) may be connected to a private network (e.g., dedicated leased lines, an optical network, etc.) or a virtual private network (VPN), such as an MPLS VPN thanks to a carrier network, via one or more links exhibiting very different network and SLA characteristics. For the sake of illustration, a given customer site may fall under any of the following categories:

1.) Site Type A: a site connected to the network (e.g., via a private or VPN link) using a single CE router and a single link, with potentially a backup link (e.g., a 3G/4G/LTE backup connection). For example, a particular CE router 110 shown in network 100 may support a given customer site, potentially also with a backup link, such as a wireless connection.

2.) Site Type B: a site connected to the network using two MPLS VPN links (e.g., from different Service Providers), with potentially a backup link (e.g., a 3G/4G/LTE connection). A site of type B may itself be of different types:

2a.) Site Type B1: a site connected to the network using two MPLS VPN links (e.g., from different Service Providers), with potentially a backup link (e.g., a 3G/4G/LTE connection).

2b.) Site Type B2: a site connected to the network using one MPLS VPN link and one link connected to the public Internet, with potentially a backup link (e.g., a 3G/4G/LTE connection). For example, a particular customer site may be connected to network 100 via PE-3 and via a separate Internet connection, potentially also with a wireless backup link.

2c.) Site Type B3: a site connected to the network using two links connected to the public Internet, with potential a backup link (e.g., a 3G/4G/LTE connection).

Notably, MPLS VPN links are usually tied to a committed SLA, whereas Internet links may either have no SLA at all or a loose SLA (e.g., a "Gold Package" Internet service connection that guarantees a certain level of performance to a customer site).

4.) Site Type C: a site of type B (e.g., types B1, B2 or B3) but with more than one CE router (e.g., a first CE router connected to one link while a second CE router is connected to the other link), and potentially a backup link (e.g., a wirleless 3G/4G/LTE backup link). For example, a particular customer site may include a first CE router 110 connected to PE-2 and a second CE router 110 connected to PE-3.

As will be appreciated, the above topologies are illustrative only and the techniques herein may be used in any other form of computer network. For example, the techniques herein may be adapted for use in a mesh network, such as an Internet of Things network. Loosely, the term "Internet of Things" or "IoT" refers to uniquely identifiable objects (things) and their virtual representations in a network-based architecture. In particular, the next frontier in the evolution of the Internet is the ability to connect more than just computers and communications devices, but rather the ability to connect "objects" in general, such as lights, appliances, vehicles, HVAC (heating, ventilating, and air-conditioning), windows and window shades and blinds, doors, locks, etc. The "Internet of Things" thus generally refers to the interconnection of objects (e.g., smart objects), such as sensors and actuators, over a computer network (e.g., IP), which may be the public Internet or a private network.

Figure 2:
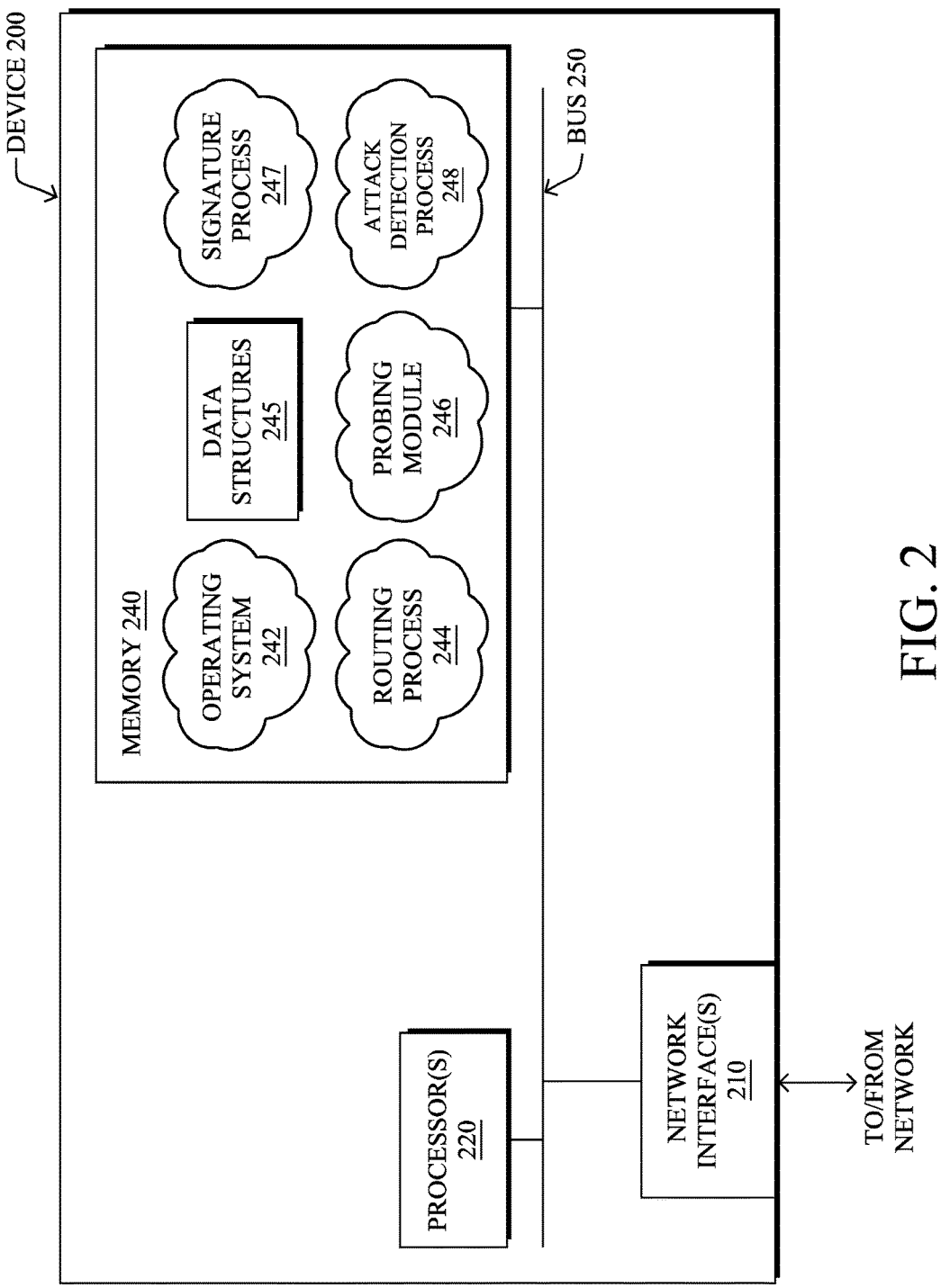
FIG. 2 illustrates an example network device/node.

FIG. 2 is a schematic block diagram of an example node/device 200 that may be used with one or more embodiments described herein, e.g., as any of the routers as shown in FIG. 1, particularly the PEs 120, CE routers 110, supervisory device(s) 125 (e.g., network controller, performance routing hub controller, etc.), or any other computing device that supports the operations of network 100 (e.g., switches, etc.). Device 200 comprises a plurality of network interfaces 210, one or more processors 220, and a memory 240 interconnected by a system bus 250. The network interfaces 210 include the mechanical, electrical, and signaling circuitry for communicating data over physical links coupled to the network 100. The network interfaces may be configured to transmit and/or receive data using a variety of different communication protocols. Notably, a physical network interface 210 may also be used to implement one or more virtual network interfaces, such as for virtual private network (VPN) accesses, known to those skilled in the art.

The memory 240 includes a plurality of storage locations that are addressable by the processor(s) 220 and the network interfaces 210 for storing software programs and data structures associated with the embodiments described herein. The processor 220 may comprise necessary elements or logic adapted to execute the software programs and manipulate the data structures 245. An operating system 242 (e.g., the Internetworking Operating System, or IOS®, of Cisco Systems, Inc., another operating system, etc.), portions of which are typically resident in memory 240 and executed by the processor(s), functionally organizes the node by, inter alia, invoking network operations in support of software processors and/or services executing on the device. These software processors and/or services may comprise routing process 244 (e.g., routing services) and illustratively, a probing module 246, a signature process 247, and/or an attack detection process 248.

It will be apparent to those skilled in the art that other processor and memory types, including various computer-readable media, may be used to store and execute program instructions pertaining to the techniques described herein. Also, while the description illustrates various processors, it is expressly contemplated that various processors may be embodied as modules configured to operate in accordance with the techniques herein (e.g., according to the functionality of a similar process). Further, while processors may be shown and/or described separately, those skilled in the art will appreciate that processors may be routines or modules within other processors.

Routing process/services 244 include computer executable instructions executed by processor 220 to perform functions provided by one or more routing protocols, such as the Interior Gateway Protocol (IGP) (e.g., Open Shortest Path First, "OSPF," and Intermediate-System-to-Intermediate-System, "IS-IS"), the Border Gateway Protocol (BGP), etc., as will be understood by those skilled in the art. These functions may be configured to manage a forwarding information database including, e.g., data used to make forwarding decisions. In particular, changes in the network topology may be communicated among routers 200 using routing protocols, such as the conventional OSPF and IS-IS link-state protocols (e.g., to "converge" to an identical view of the network topology).

Notably, routing process 244 may also perform functions related to virtual routing protocols, such as maintaining VRF instance, or tunneling protocols, such as for MPLS, generalized MPLS (GMPLS), etc., each as will be understood by those skilled in the art. Also, EVPN, e.g., as described in the IETF Internet Draft entitled "BGP MPLS Based Ethernet VPN" <draft-ietf-l2vpn-evpn>, introduce a solution for multipoint L2VPN services, with advanced multi-homing capabilities, using BGP for distributing customer/client media access control (MAC) address reach-ability information over the core MPLS/IP network.

Figure 3A:
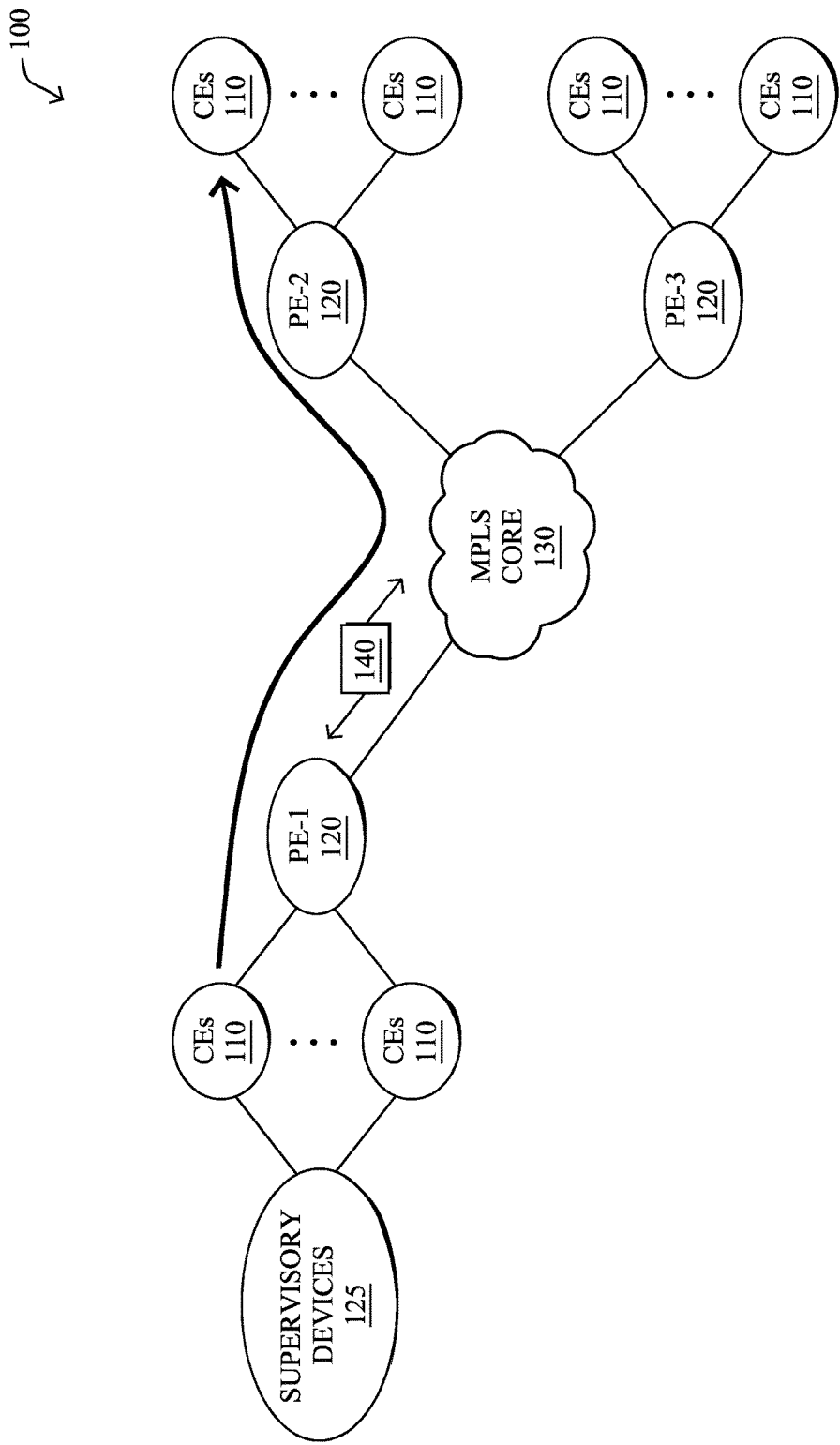
FIGS. 3A-3C illustrate an example of a threshold crossing alert (TCA) being generated in the communication network of FIG. 1.
Figure 3B:
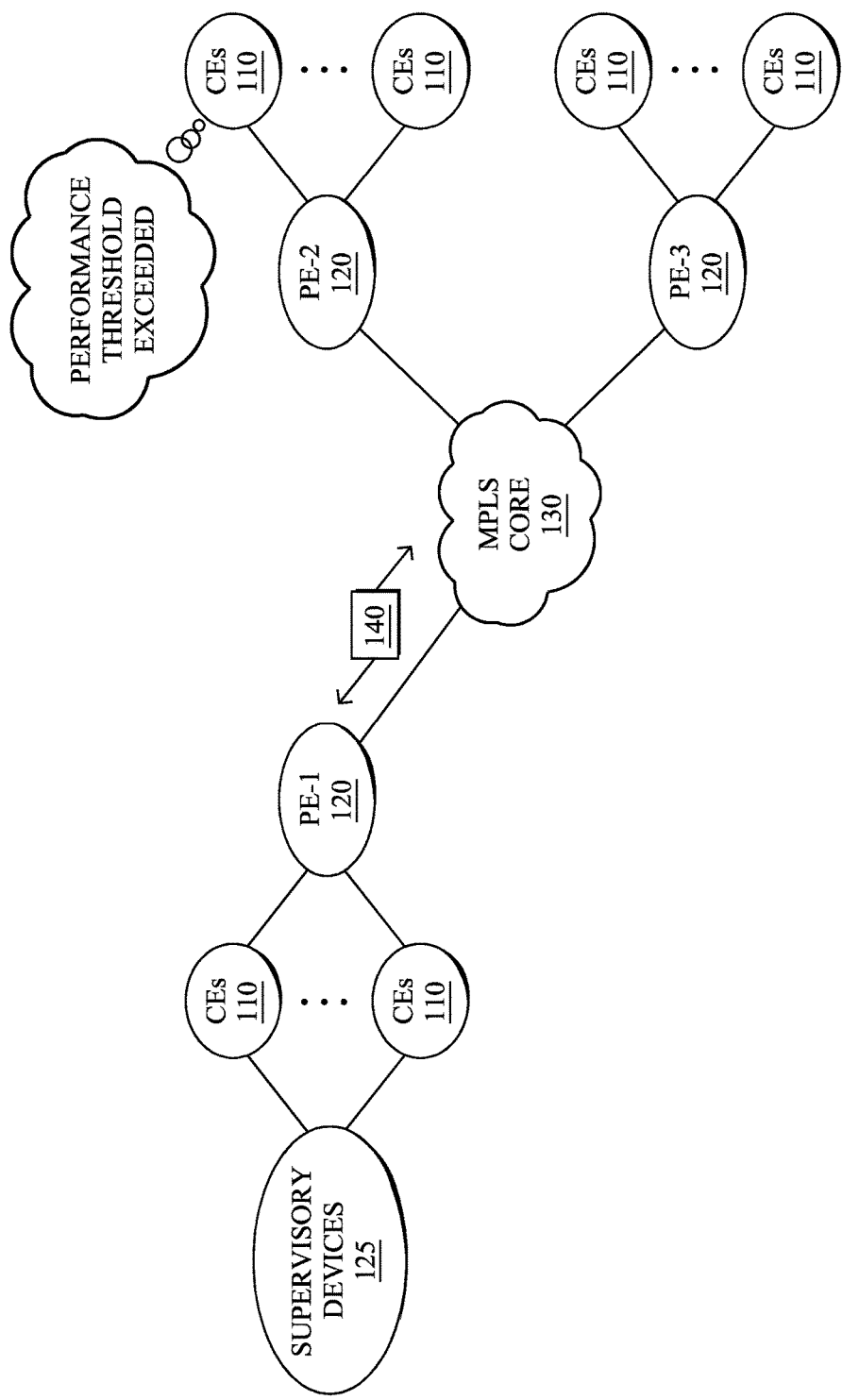
Figure 3C:
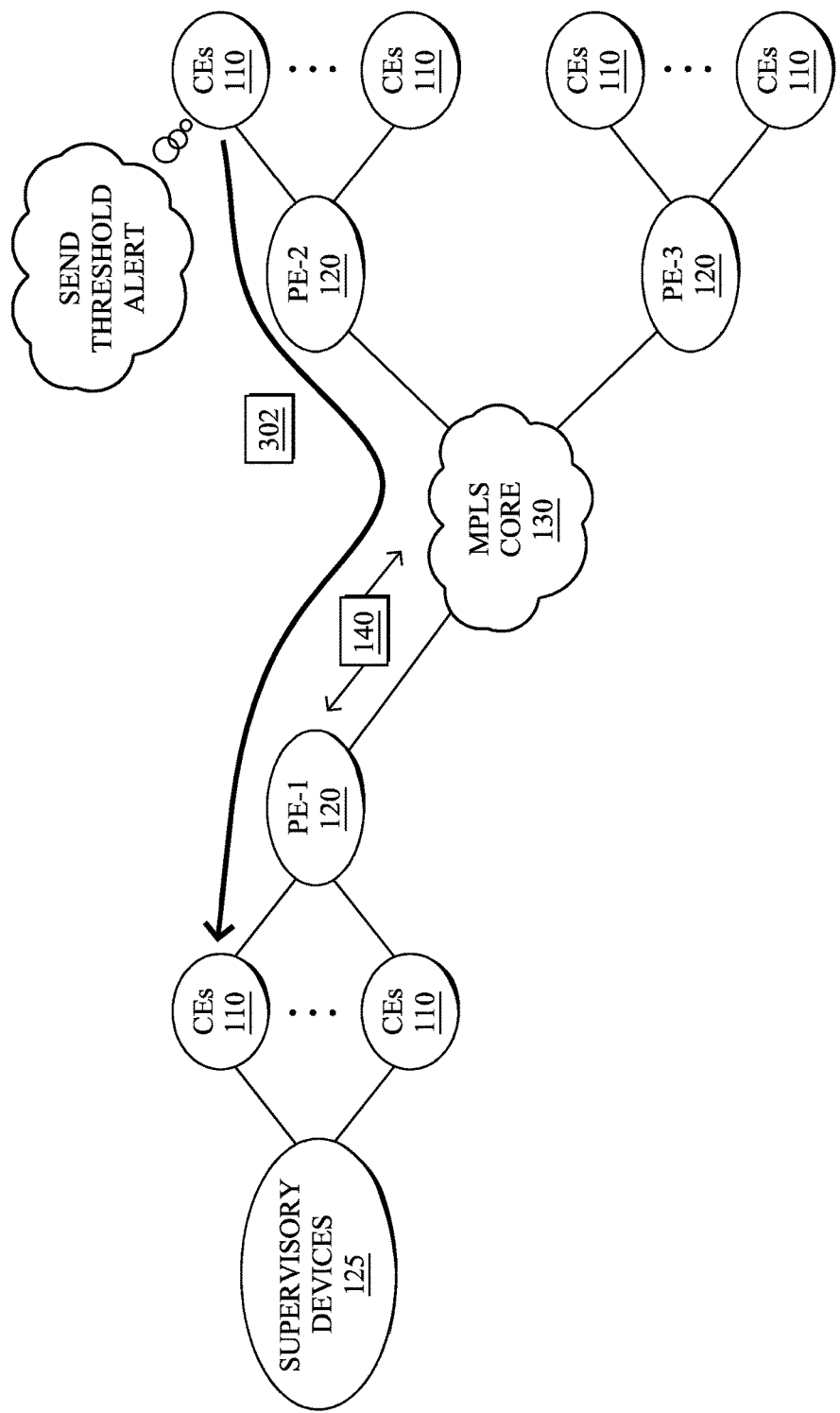

In various cases, routing process 244 may further be configured to generate and/or receive threshold crossing alerts (TCAs) regarding one or more characteristics of a network path. In general, a TCA is a notification that a measured characteristic (e.g., jitter, delay, etc.) of a network path has exceeded a threshold value. Routing process 244 may use a TCA to dynamically adjust the routing of packets. An example of a TCA being generated in computer network 100 is shown in FIGS. 3A-3C. In FIG. 3A, traffic is sent from a first CE router 110 to a second CE router 110 via the core network 130. Packets of the traffic flow may include information such as a timestamp that indicates when a packet was sent and/or any other information that may be used by the destination device to determine a characteristic of the network path. As shown in FIG. 3B, for example, the destination router may use the information in the packet to calculate the network characteristic and determine whether or not the characteristic exceeds a defined threshold. For example, if the time difference between when the packet was sent and when the packet was received (e.g., the path delay) is greater than a threshold amount, the destination device may determine that a performance threshold for the path has been exceeded. In response, the destination device may send a TCA 302 back along the communication path, to notify the originating router and/or any other routers along the path of the exceeded threshold. Based on TCA 302, a router may dynamically make a routing adjustment, such as selecting a different path to use. Such a performance routing mechanism may be used, for example, to ensure that transmission of a traffic flow satisfies one or more quality of service (QoS) requirements of the flow.

In some cases, the use of TCAs in a network may present an attack opportunity in the network. For example, in a typical performance routing operation, hubs can be identified using packet sniffing of the probe/TCA packets. This could also be done using sniffing of service advertising framework (SAF) packets that are used to share the information between a performance routing hub master controller (MC) (e.g., a supervisory device 125 that oversees the performance routing of CEs 110 for a given location) and the branch MC/border routers (e.g., any of CE routers 110 at a given location, etc.). This situation is further exacerbated by the fact that TCAs generated in the performance routing hub may use non-encrypted channels, allowing a malicious entity insight into the TCAs.

A reflection-based attack is conceivable by causing traffic oscillations in the network, thereby creating instability in the network and deteriorating the quality of user experience. As a first step, a malicious entity may capture or sniff TCAs generated by any of the performance routing elements of the network. Then, the malicious entity may generate similar TCAs in multiple directions to create a state of confusion in the network and causing traffic to keep oscillating. In another mechanism, the malicious entity may selectively regenerate TCAs. For example, the malicious entity may send out a TCA knowing that it will cause a change in a communication path. The malicious entity may then wait for a certain moment of traffic stability on the new path before sending a new TCA, this time on the new path, thereby causing another switchover of traffic to the old path.

In another conceivable attack, a malicious entity may sniff relevant information from the SAF packets. Typically, SAF is used as the underlying protocol to share performance routing control information and may potentially provide all information about the endpoints, DSCPs and corresponding source-destination pairs. Again, using this information, the malicious entity could use this information to create channel-specific TCAs, to subtly keep causing oscillations in certain traffic classes.

In the above scenarios, the event of traffic switchover can be determined when SAF packets communicate the flow of traffic on new paths. This information, captured by a malicious entity can further confirm to the entity that its stimulus is having an effect on the network. To date, there is no current technology that will be able to differentiate malicious TCAs from legitimate TCAs, meaning that traffic could continue oscillating forever without detection of an attack.

Mitigating Reflection-Based Network Attacks

The techniques herein recognize and mitigate a denial of service (DoS) attack that seeks to take advantage of the functionality of the performance routing components in a network (e.g., a reflection-based DoS attack that uses TCAs). In some aspects, TCA packets may be signed or encrypted, to validate the authenticity of a received TCA or to keep the TCA payload secure. In another aspect, a machine learning process may be used to track network characteristics and use these characteristics to predict when a TCA is expected. In yet another aspect, a device may validate the authenticity of a TCA by seeking validation from another device. This may be done, for example, by comparing the characteristics and conditions of the paths and figuring out whether there is any discrepancy in the condition being reported by the TCA. In further aspects, additional traffic may be generated, to confirm the authenticity of the TCAs. For example, network characteristics reported by the TCA may be probed or dummy traffic may be sent to the other endpoint for confirmation of the switchover request.

Specifically, according to one or more embodiments of the disclosure as described in detail below, a network device routes traffic along a network path and receives a performance threshold crossing alert regarding performance of the network path. The network device detects that the performance threshold crossing alert is part of a potential network attack by analyzing, by the device, the performance threshold crossing alert. The network device also provides a notification of the detected network attack.

Illustratively, the techniques described herein may be performed by hardware, software, and/or firmware, such as in accordance with routing process 244 and/or processes 247-248, which may include computer executable instructions executed by the processor 220 to perform functions relating to the techniques described herein. For example, the techniques herein may be treated as extensions to conventional protocols, such as the various communication protocols, and as such, may be processed by similar components understood in the art that execute those protocols, accordingly.

Operationally, various techniques are disclosed herein that allow TCAs to be validated, thereby mitigating any potential effects of a DoS attack that target the performance routing mechanisms of a network. Notably, the mitigation techniques may function autonomously and may be deployed individually or in conjunction with one another.

Figure 4A:
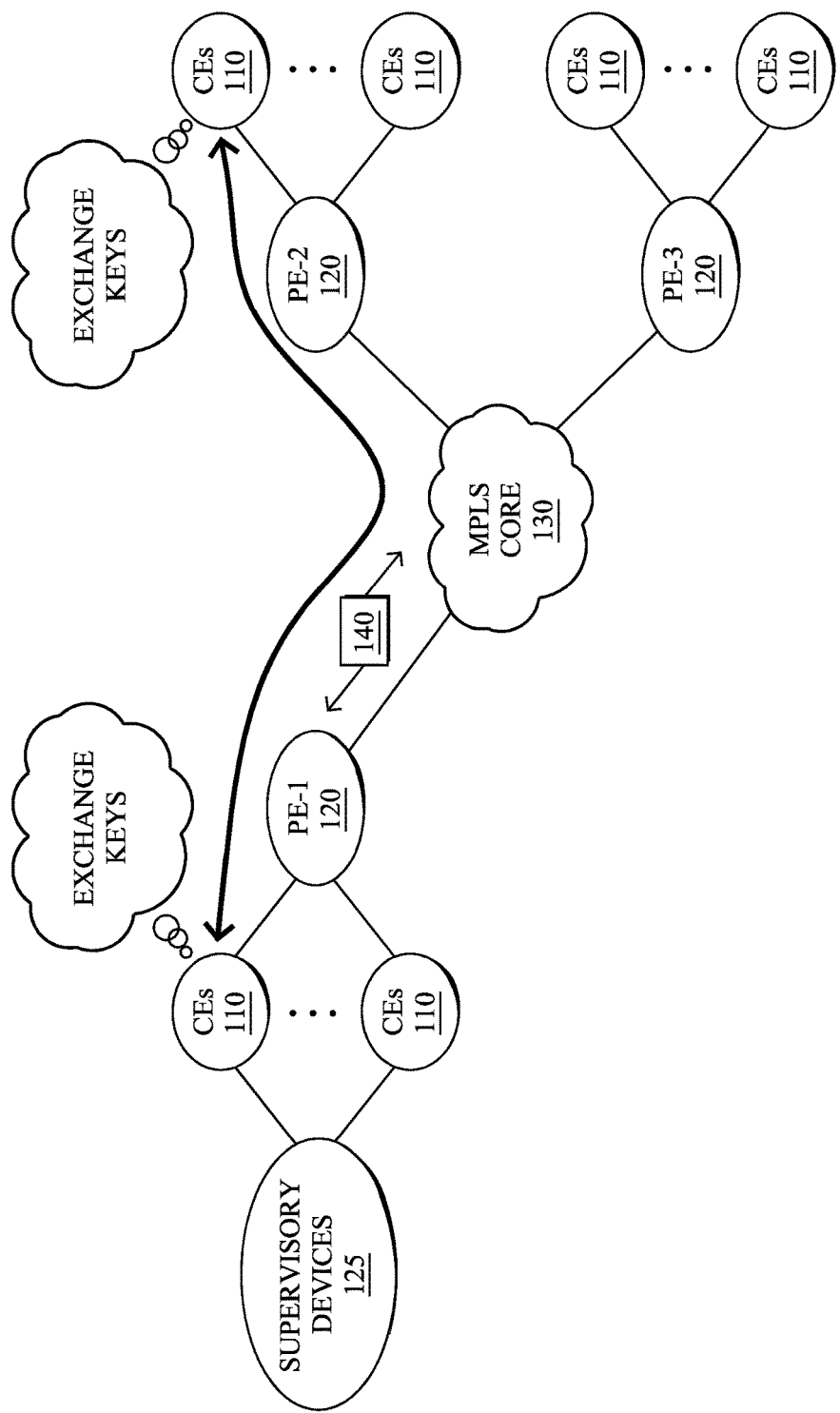
FIGS. 4A-4B illustrate an example of a signature mechanism for TCAs.
Figure 4B:
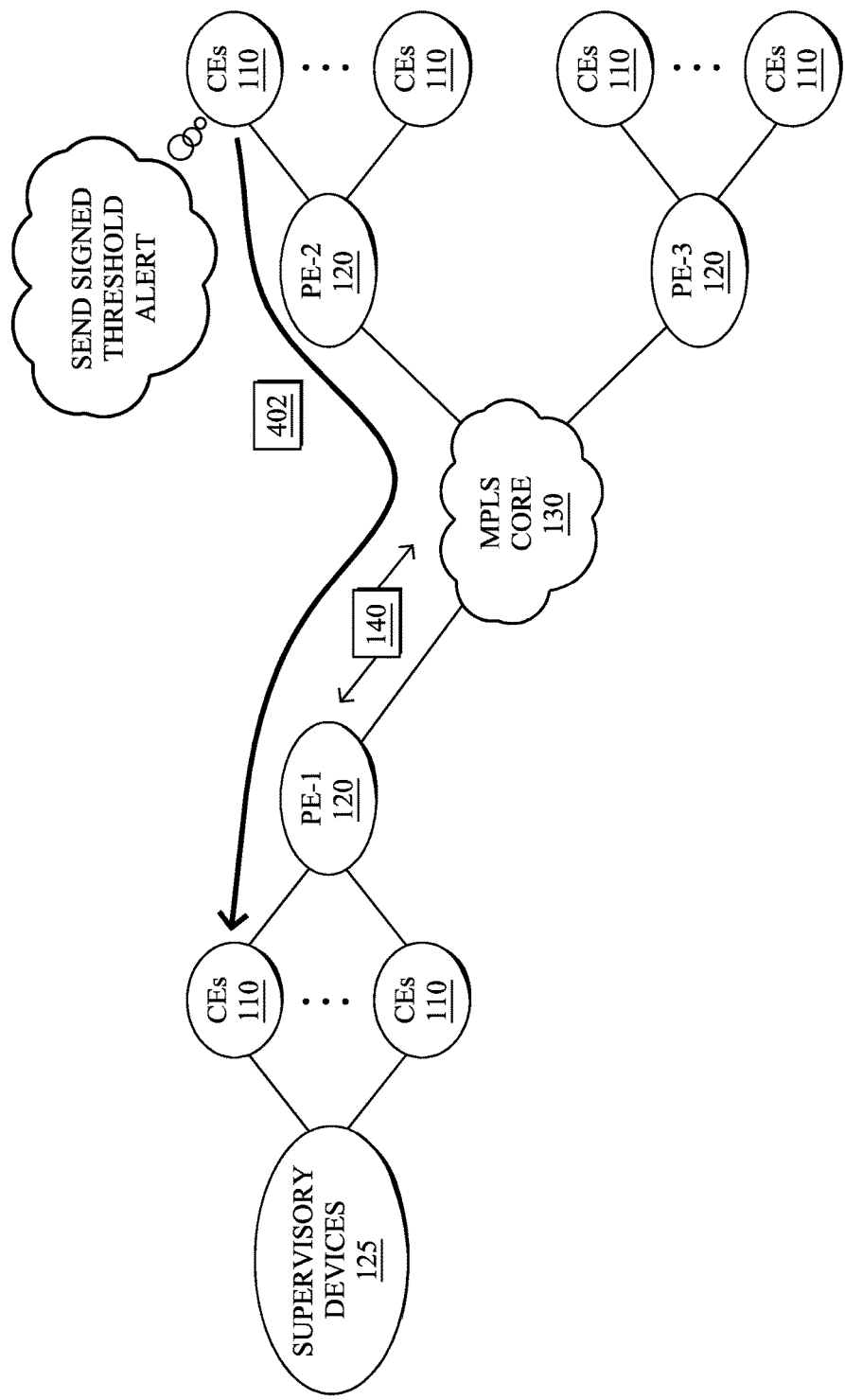

In a first embodiment, a signature mechanism is disclosed. First, a key handshake phase may take place before performance routing is enabled in the network. In this stage, keys and random seeds are exchanged beforehand so that the various entities know each other and determine the legitimacy of each other's messages. For example, as shown in FIG. 4A, devices/routers may exchange keys and random seeds before performance routing is enabled. Once a TCA needs to be generated, the corresponding entity may then sign the TCA with a one-time key before sending the TCA. For example, as shown in FIG. 4B, a router at a destination end of a routing path may send a signed TCA 402 back towards the router sending the traffic. In response to receiving signed TCA 402, the receiving device may then validate the signature before taking any corrective actions (e.g., by using a different routing path). The one-time keys used to sign TCAs may be generated using the random seeds that were generated in the handshake phase, allowing each entity to know the new key being generated at the counterpart's end.

Encryption technologies like transport layer security (TLS) or secure socket layer (SSL) can be used to completely encrypt the TCA control and payload information. These techniques using asymmetric cryptography maintain forward secrecy where short term session keys cannot be derived from long term asymmetric secret keys. In these implementations, sniffing the TCA packets will not be of much use as the concerned information is encrypted. In such an embodiment, keys may be determined using an offline certificate/key authority and then imported into the concerned routers using secure access.

In another embodiment, a lightweight machine learning process may be used to compute the probability of receiving a TCA according to the traffic characteristics. In general, machine learning is concerned with the design and the development of techniques that take as input empirical data (such as network statistics and performance indicators), and recognize complex patterns in these data. One very common pattern among machine learning techniques is the use of an underlying model M, whose parameters are optimized for minimizing the cost function associated to M, given the input data. For instance, in the context of classification, the model M may be a straight line that separates the data into two classes (e.g., labels) such that $M=a*x+b*y+c$ and the cost function would be the number of misclassified points. The learning process then operates by adjusting the parameters a,b,c such that the number of misclassified points is minimal. After this optimization phase (or learning phase), the model M can be used very easily to classify new data points. Often, M is a statistical model, and the cost function is inversely proportional to the likelihood of M, given the input data.

The machine learning process may also make use of a time series of data points, measured at successive points in time, and typically spaced at uniform time intervals. For example, consider a time series that represents the amount of traffic TA generated by application A at regular time t1, t2, t3, . . . :

TA={TA,1, TA,2, TA,3, . . . }

Time series forecasting entails constructing a statistical model that is able, at time t, to yield estimates of the quantities TA,t+1, TA,t+2, TA,t+3, etc. May such models may be used, such as those that rely on autoregression (e.g., that TA,t+1 depends linearly on previous values TA,t−2, TA,t−1, TA,t) and on a moving average (e.g., that TA,t+1 depends on the average of a given number of previous values TA,t−2, TA,t−1, TA,t). Generally speaking, these types of models are known as autoregressive moving-average (ARMA) models. Other models that may be used to model a time series are Hidden Markov Models (HMMs) and Gaussian Processes.

Figure 5A:
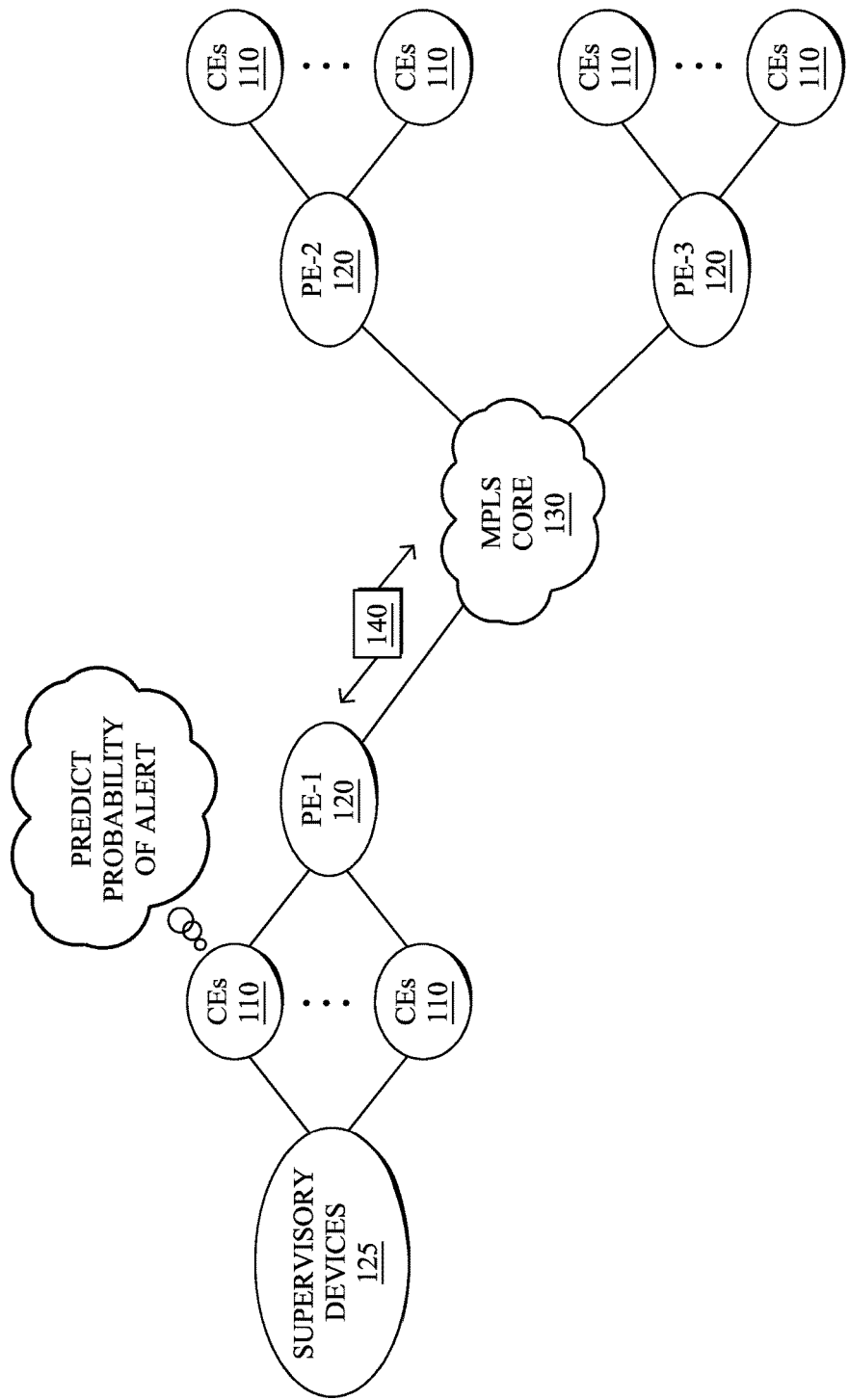
FIGS. 5A-5C illustrate an example of a machine learning technique being used to analyze a TCA.
Figure 5B:
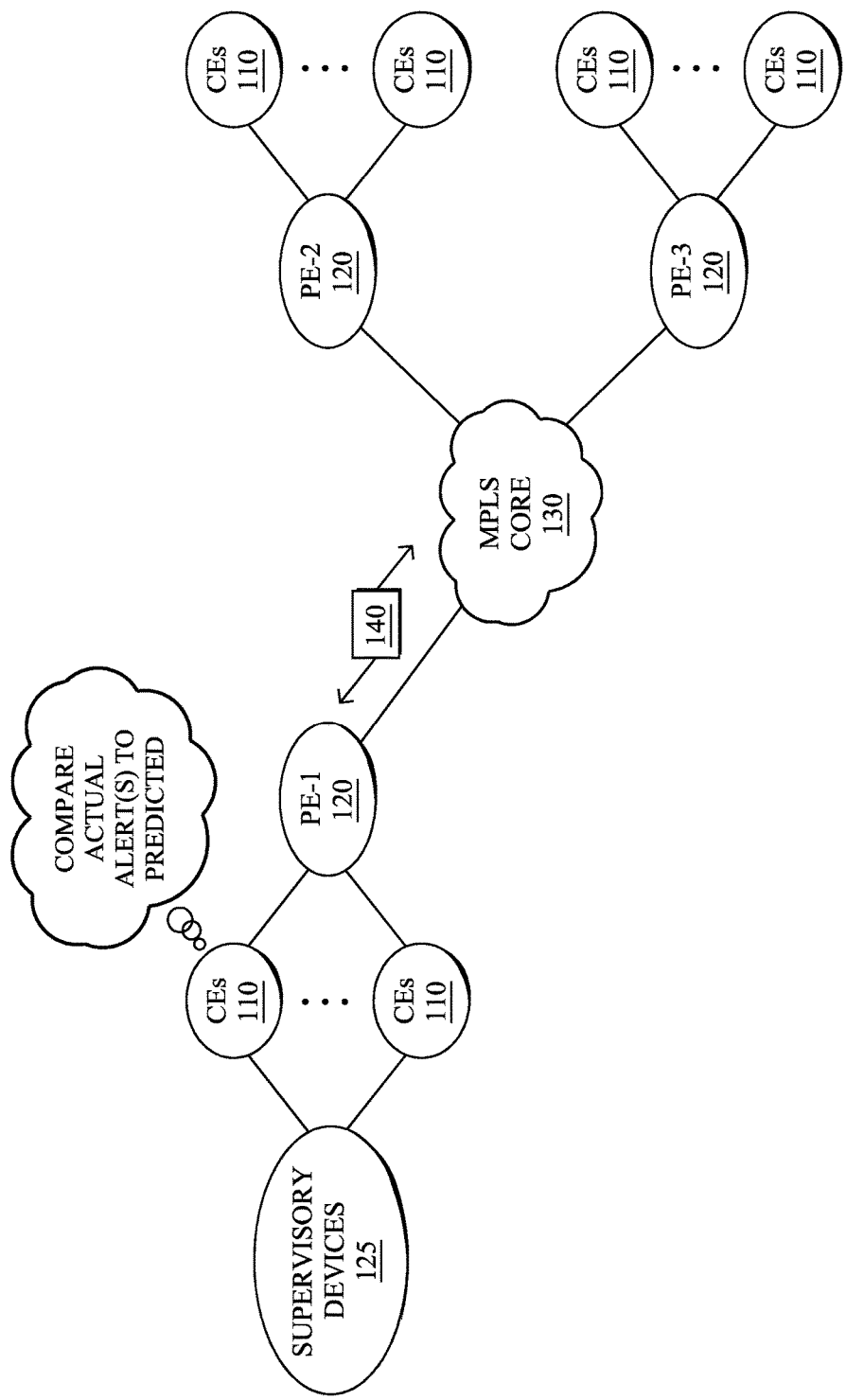
Figure 5C:
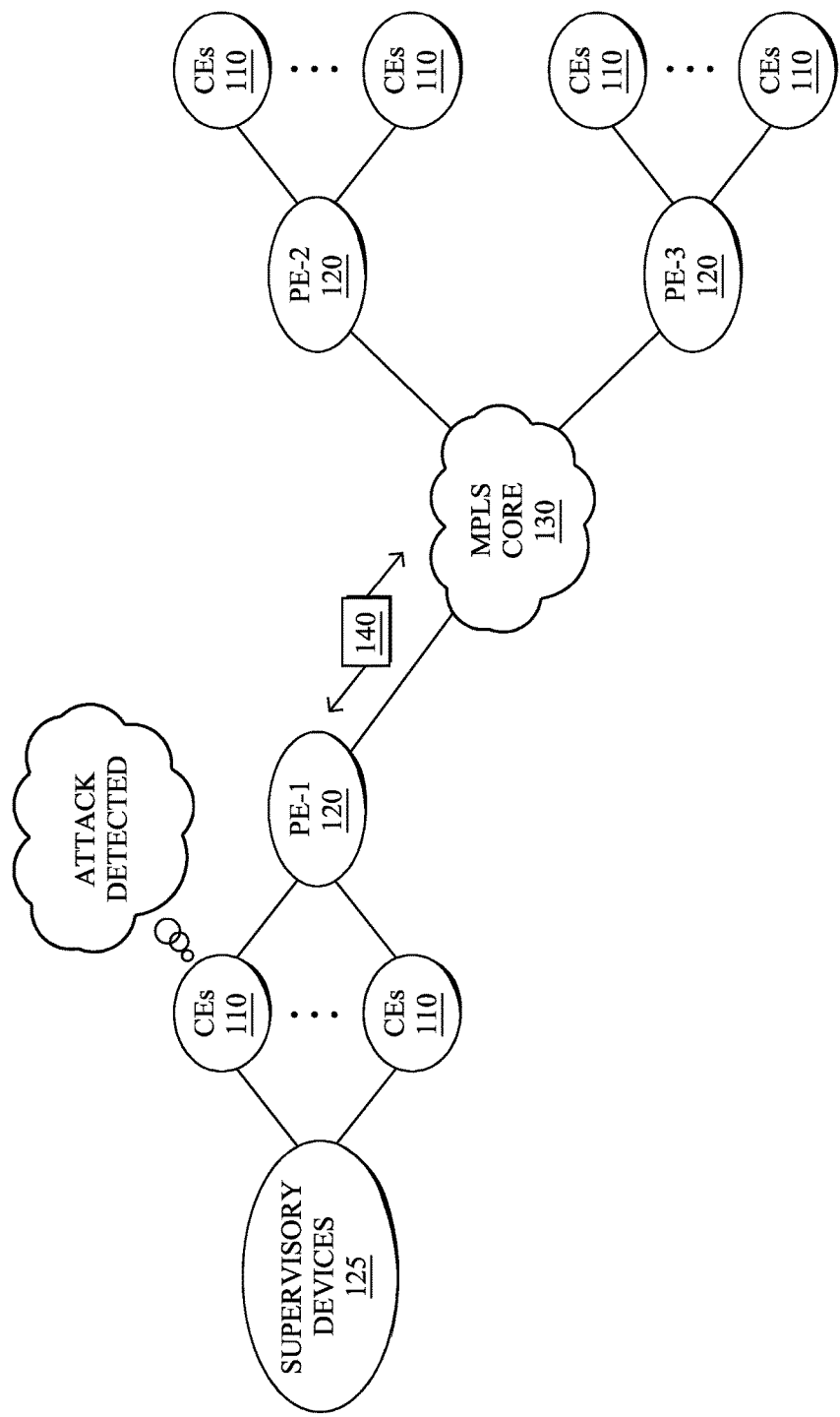

In one implementation, the machine learning process may be an artificial neural network (ANN) trained locally on the router using the traffic input characteristic as the input of the ANN. As output, the ANN may then calculate a probability of receiving a TCA (e.g., the output may make use of a soft-max or a log sigmoid function). Such an ANN may then be used to correlate the traffic characteristics with the probability of receiving a TCA to trigger a path change. For example, as shown in FIGS. 5A-5C, a particular router may use a machine learning process to predict the probability of receiving a TCA and use the prediction to validate a received TCA. The ANN may be deployed anywhere in the network. For example, the ANN may be deployed in the hub of a hub & spoke network topology or in a data center. In other embodiments, the ANN may be deployed on the router receiving the TCA itself.

In response to receiving a TCA, this event may be validated with the above determined probability in order to detect anomaly. A simple approach may involve determining the probability that the TCA is in fact a DoS TCA by using a statistic test such as the Kolmogorov-Smirnov (KS) test. The KS test generally allows calculation of the distance between two empirical distributions (e.g., the KS test evaluates the difference in terms of location and shape of cumulative distributions). In cases in which the machine learning model generates a probability distribution function (PDF) to predict receipt of a TCA for a specific traffic and/or destination, the KS test may then be used to compare the actual PDF of the received TCA with the computed PDF of the TCA under normal conditions, to detect a possible DoS TCA.

In one embodiment, using configured thresholds, the learning machine process may seek human confirmation and intervention, if there is high probability of the TCA being malicious. For example, the attack detector may provide a notification to a user interface, after which a human operator may opt to override the decision to switchover traffic.

Figure 6:
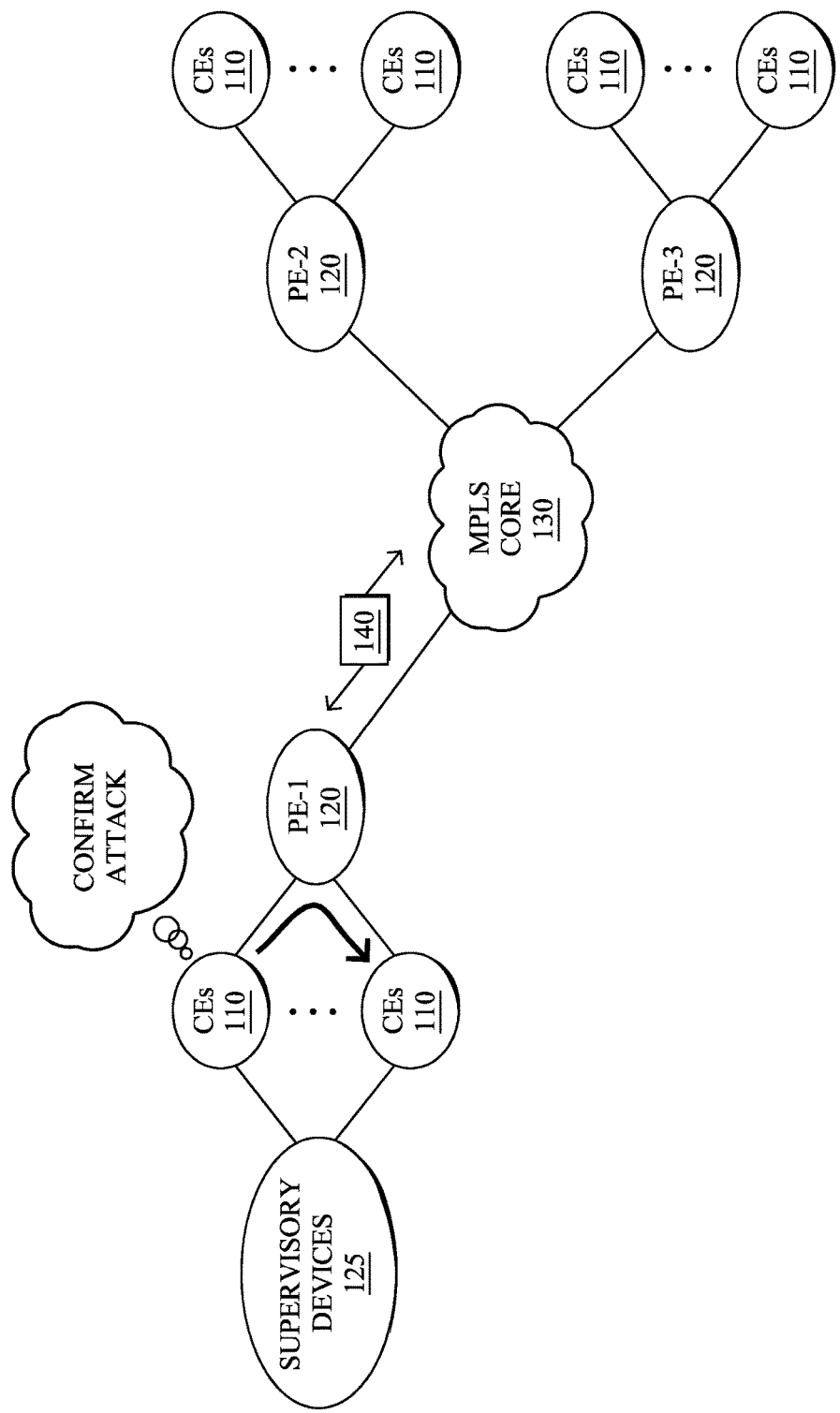
FIG. 6 illustrates an example of a device requesting confirmation of a TCA.

In another embodiment, one or more other network devices may be queried to validate a TCA. For example, the router receiving the TCA may decide to determine whether the TCA is likely to be valid by sending a request to other routers using a similar path, as illustrated in FIG. 6. In a common deployment scenario, there are multiple co-located branch MC/border routers (e.g., CE routers 110) that interact with the co-located performance routing hub (e.g., a supervisory device 125). In such a deployment, a branch MC/border may identify the set of co-located MC/border routers that make use of a similar path. For example, if a MC/border router starts receiving TCA, it may post an event seeking other MC/Branch routers that use a similar communication path and received a corresponding TCA alarm.

Notably, using a peer device to validate a TCA is not by itself proof that the TCA is a DoS TCA event if the MC/border router is the only one receiving TCA. However, if one MC/branch router (e.g., a CE router 110) receives many TCAs while others do not receive any from a co-located remote performance routing hub, or if all MC/branch receive TCAs from a remote performance routing hub, this may indicate that the TCA is a DoS TCA. Note also that TCAs received by other MC-border routers could increase the reliability of the KS test, in some implementations.

In yet another approach, time-based correlation of TCA reception may be determined by a machine learning process hosted on a branch/MC. Upon receiving a TCA, a MC/border router may report it to other co-located MC/Border using a link-local custom IP message. Such an approach would then be used to determine the probability that a set of co-located MC/border routers simultaneously receive a TCA. In response to receiving a TCA, a MC/border router may poll is co-located MC/border router to see if they also receive a TCA. Once again, such an approach is probabilistic and may not work in all case if the attacks target multiple MC/border, but would definitely increase the likelihood of detecting a DoS TCA.

Figure 7:
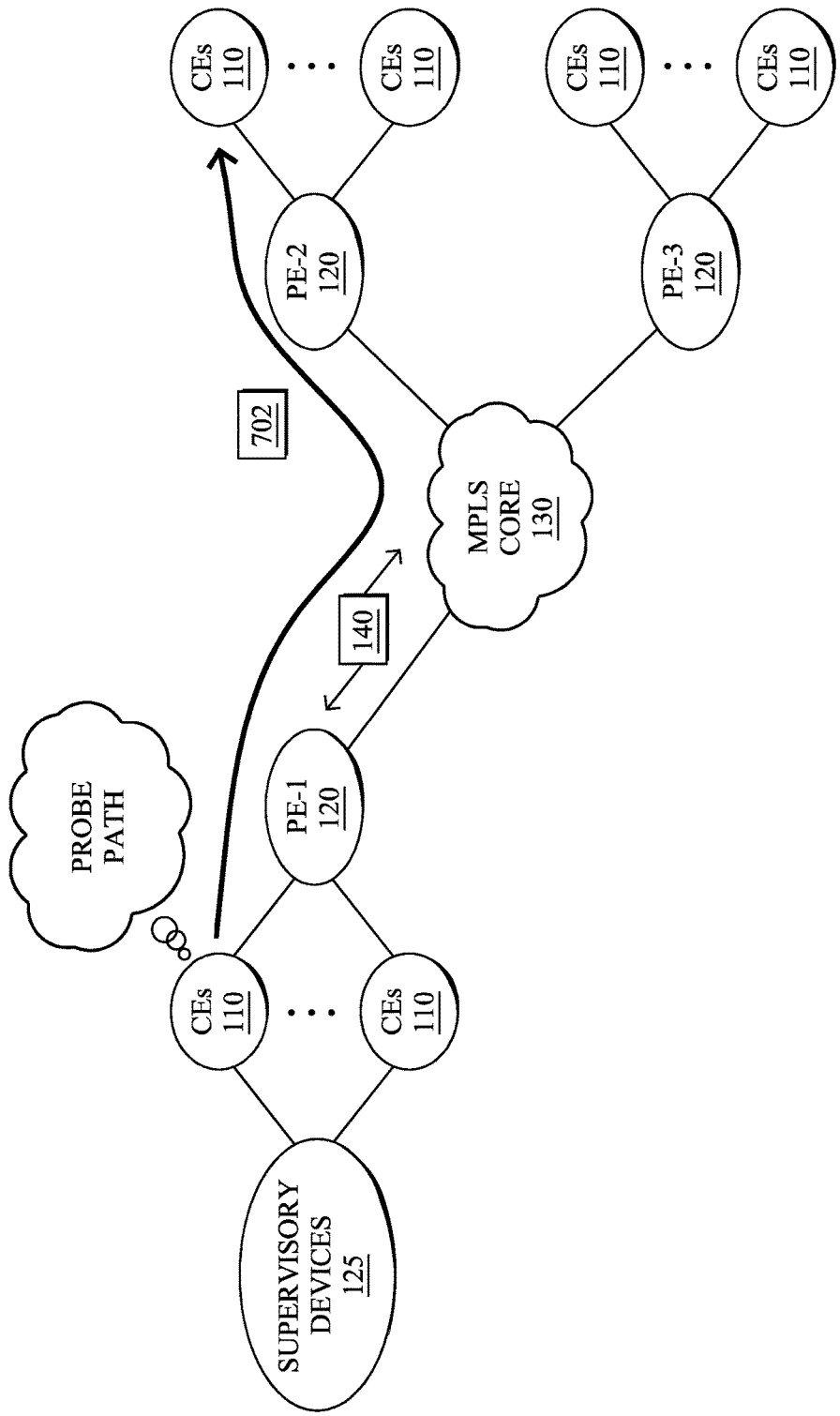
FIG. 7 illustrates an example of a communication path being probed to validate a TCA.

In yet a further approach, after every TCA is received, a new train of probes may be sent out, to specifically re-measure the parameters that have been reported in the TCA. For example, as shown in FIG. 7, probes 702 may be sent along a particular path, to measure the path characteristics that correspond to the TCA. Different strategies may also be used in order to quickly change the class of service (CoS) of traffic (e.g., to make the DoS attack less efficient).

In another approach the MC/Border router may send encrypted traffic to the performance routing hub with the same CoS as the one for which a TCA has been received, to further validate whether or not the TCA is likely to be a valid TCA. This train of probes measures the network characteristics specifically to validate the TCA. If the probe measures results that are contrary to what the TCA is reporting, then the routing switchover decision is overridden. In addition, this information can later be fed into a learning machine profiler to track so that future TCAs can be classified as well. At this point, a custom message (e.g., a CoAP, SNMP or NETCONF message) may be sent to the end-user or to an NMS system (e.g., on of supervisory devices 125) and includes the received TCA indicative of a suspicious TCA for further analysis. In other words, information regarding a TCA may be provided to a user interface device (e.g., an electronic display, etc.) that requests manual review of the TCA by an end-user. In response, the user interface device may provide a notification that indicates whether or not the TCA is part of an attempted attack.

Figure 8A:
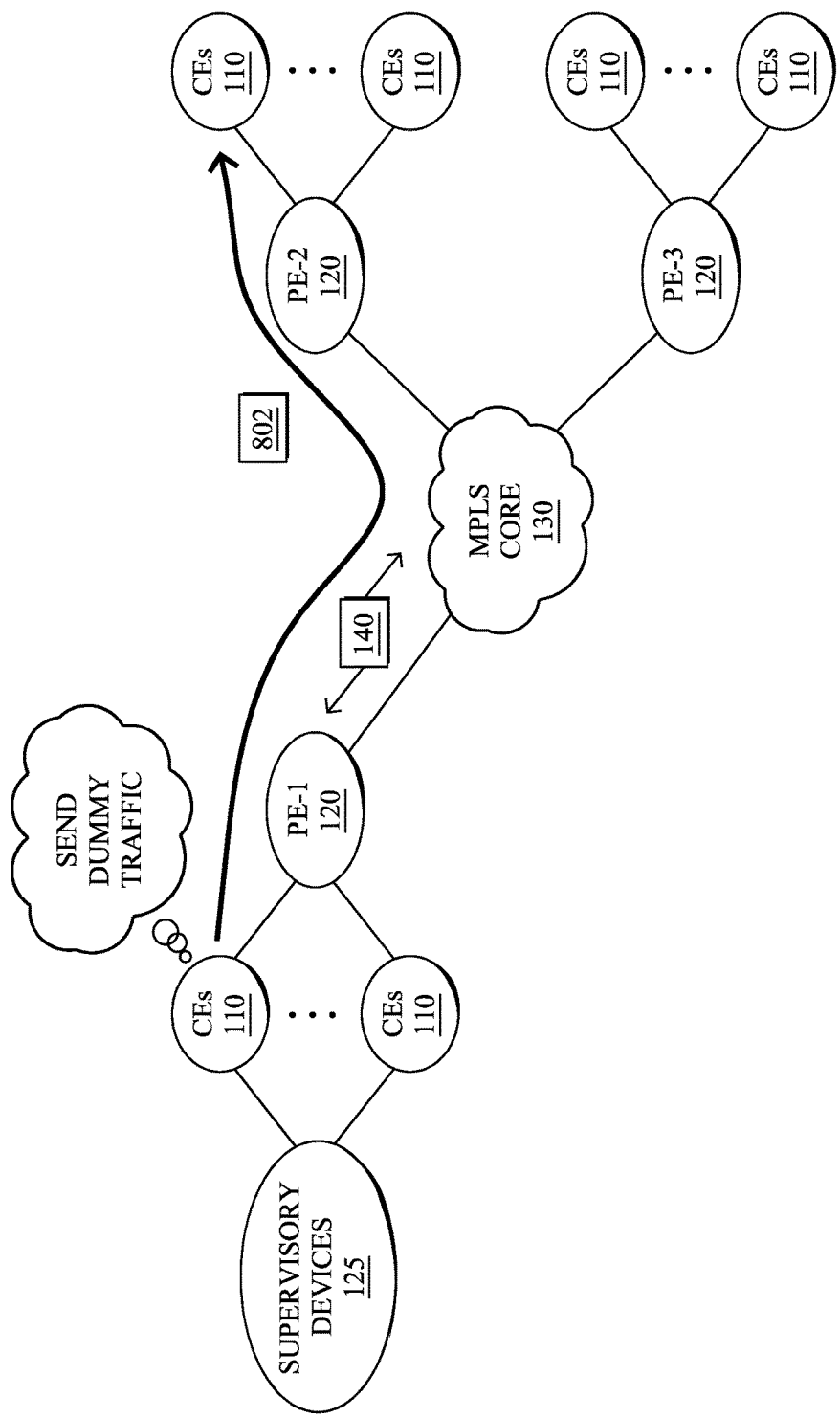
FIGS. 8A-8B illustrate an example of a TCA being validated by sending dummy traffic along a communication path.
Figure 8B:
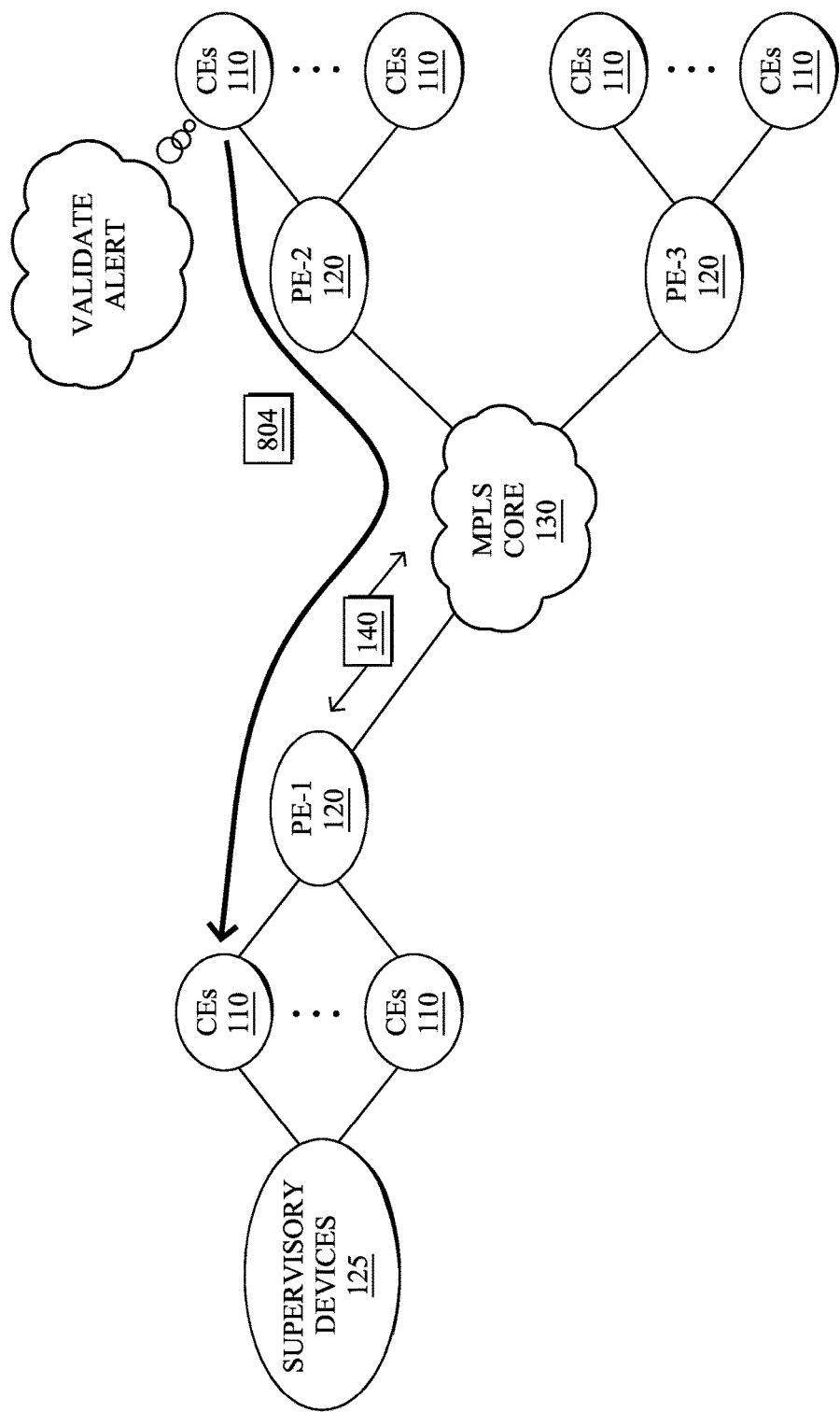

In still another mitigation approach, once the TCA is received, the recipient of the TCA may choose to send 'dummy' traffic on the alternate path. The dummy traffic in this case can be packets that include all the control information corresponding to the class of traffic associated with the TCA, but excluding the payload. This in turn can act as a signal for the other end of the path to validate whether it really sent a TCA or not because it would not know why there is traffic on the alternate path. For example, as shown in FIGS. 8A-8B, dummy traffic 802 may be sent to the other end of the path, which then validates whether it sent the TCA, and returns a notification 804 back to the querying device as to the validity of the TCA. Also, using this approach, a malicious eavesdropper will not see any control traffic go through the path, and will not have the capability to modify validation signals. If a legitimate TCA is received, the other end may send a copy of the dummy traffic back (e.g., as notification 804). Otherwise, nothing may be sent back, signaling to the recipient that there is some malicious activity regarding TCAs.

Figure 9:
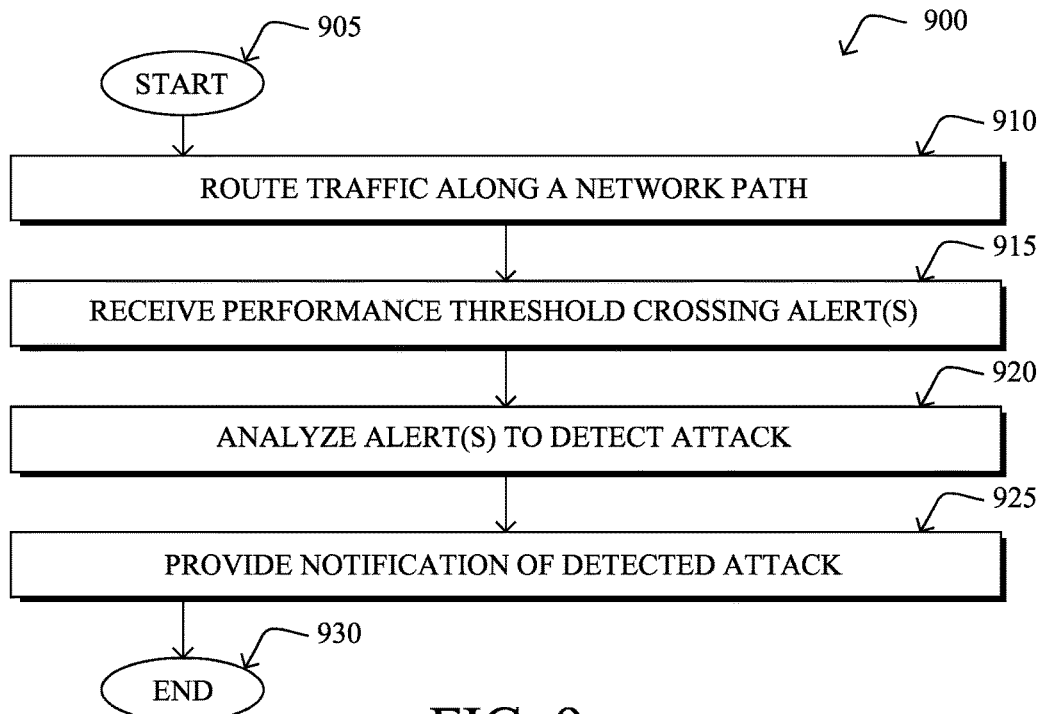
FIG. 9 illustrates an example simplified procedure for detecting a reflection-based network attack.

FIG. 9 illustrates an example simplified procedure for detecting a reflection-based network attack in accordance with one or more embodiments described herein. The procedure 900 may start at step 905, and continues to step 910, where, as described in greater detail above, traffic may be routed along a path by a network node/device. In various cases, the network path may be selected using a performance routing mechanism in the network whereby TCAs are used to signal path changes. In other words, a TCA may signify that a different path should be used, since the performance of the current path has degraded beyond a threshold level (e.g., the number of dropped packets exceeds a threshold amount, the amount of delay or jitter exceeds a threshold amount, etc.).

At step 915, one or more TCAs are received, as highlighted above. In general, the threshold used to trigger a TCA may be set by a network administrator or automatically. For example, a TCA may be generated if the amount of delay or jitter along the network path exceeds a predefined threshold amount.

At step 920, the one or more TCAs are analyzed to detect a potential network attack, as described in greater detail above. In other words, a TCA may be analyzed to detect whether the TCA is part of a potential network attack. As described herein, some conceivable network attacks may take advantage of the TCA mechanism of a network, to cause oscillations in the selected paths (e.g., by triggering a path change to a new path, triggering another path change for the new path, etc.). Various attack mitigation approaches may be used to analyze the one or more TCAs. For example, in various embodiments, the device may determine whether or not a TCA has a valid digital signature, whether a machine learning process predicted reception of the TCA, by requesting that one or more peer devices validate the TCA, by probing the network path to confirm the validity of the TCA, or by generating and sending dummy traffic along the network path so that a device on the destination end of the path can confirm or deny the validity of the TCA.

At step 925, the device provides a notification of the detected attack to another device, as detailed above. For example, a notification of a potential attack may be sent to a user interface device, thereby allowing a human operator to further assess the detected attack. In another example, the notification may be sent to an NMS or other supervisory device for further analysis and/or as part of a reporting mechanism. Procedure 900 then ends at step 930.

Figure 10:
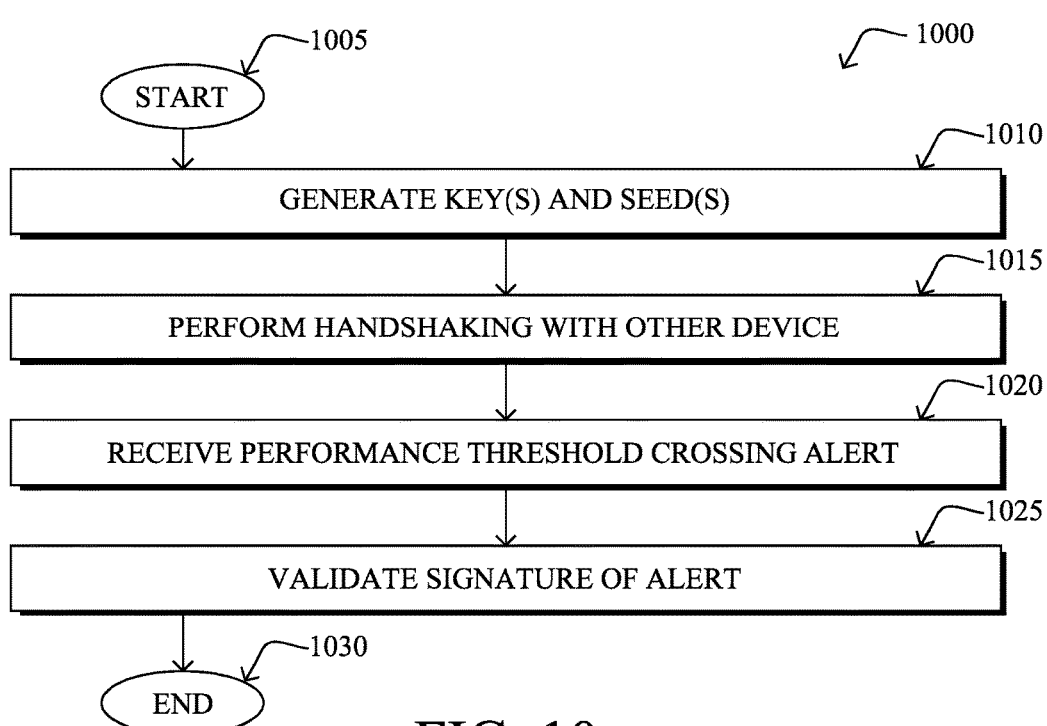
FIG. 10 illustrates an example simplified procedure for using signed TCAs to detect a reflection-based attack.

FIG. 10 illustrates an example simplified procedure for using signed TCAs to detect a reflection-based attack in accordance with one or more embodiments described herein. The procedure 1000 may start at step 1005, and continues to step 1010, where, as described in greater detail above, key and seed values may be generated. For example, prior to enabling the performance routing mechanism in the network, a router may generate any number of key values and random seeds (e.g., key/certificate generation seed values).

At step 1015, the device may perform handshaking with another device, as detailed above. For example, prior to enabling performance routing in the network, the device may exchange its keys and random seeds with another device that is configured to generate a TCA. The exchanged keys and random seeds may then be used by the other device to generate a signature for inclusion in a given TCA.

At step 1020, a TCA is received from the other device, as described in greater detail above. Such a TCA may be signed using the exchanged keys and seed values during the handshaking of step 1015. For example, the TCA may be signed using a one-time key by the sending device. In some embodiments, the TCA may also be encrypted using, for example, SSL or TLS, to protect the payload of the TCA from snoopers.

At step 1025, the signature of the TCA is validated, as detailed above. If, for example, the signature does not match the expected signature of the device that participated in the handshake, the receiving device may flag the TCA as a potential network attack. In such cases, the device may initiate countermeasures, such as notifying a network administrator. However, if the TCA is validated, the device may take other actions, such as switching a routing path. Procedure 1000 then ends at step 1030.

Figure 11:
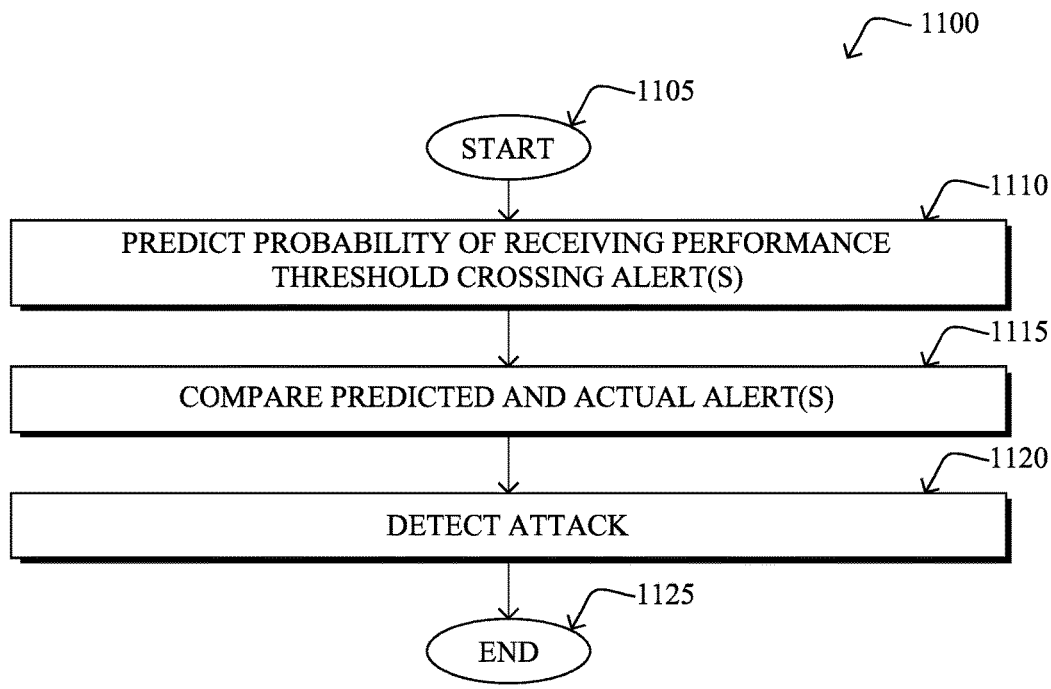
FIG. 11 illustrates an example simplified procedure for detecting a reflection-based attack using predicted TCAs.

FIG. 11 illustrates an example simplified procedure for detecting a reflection-based attack using predicted TCAs in accordance with one or more embodiments described herein. The procedure 1100 may start at step 1105, and continues to step 1110, where, as described in greater detail above, a probability of receiving one or more TCAs is predicted. For example, a device may use observed network characteristics as input to a machine learning process, to predict the probability of a TCA being generated. Any number of machine learning techniques may be used such as, but not limited to, ANNs, HMMs, Gaussian Processes, and the like.

At step 1115, the predicted probability and any actually received TCAs are compared, as detailed above. For example, a KS test may be used to compare a PDF generated by the machine learning process to the PDF of actually received TCAs. Assuming, for example, that the prediction mechanism is well able to predict TCAs, arrival of a TCA at an unsuspected time may indicate that the TCA is part of an attempted attack.

At step 1120, as described above, a potential network attack is detected based on the comparison between the predicted TCAs and actual TCAs. For example, if the difference between the predicted probability of receiving TCAs and the actual reception of TCAs differs by a threshold amount, this may indicate that a received TCA is malicious. Procedure 1100 then ends at step 1125.

Figure 12:
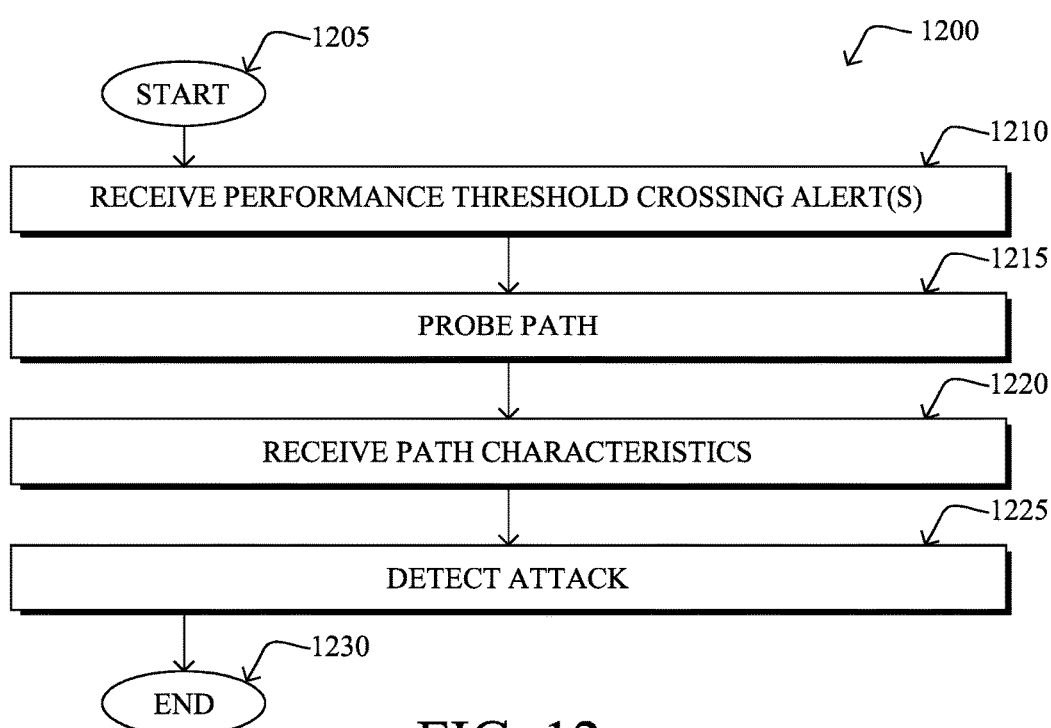
FIG. 12 illustrates an example simplified procedure for probing a communication path to detect a network attack.

FIG. 12 illustrates an example simplified procedure for probing a communication path to detect a network attack in accordance with one or more embodiments described herein. The procedure 1200 may start at step 1205, and continues to step 1210, where, as described in greater detail above, one or more TCAs may be received by a device in the network. A noted above, such a TCA may be received as part of a performance routing mechanism, thereby signaling a path change due to the characteristics of a path exceeding one or more thresholds.

At step 1215, the device that received a TCA may probe the network path corresponding to the TCA, as described in greater detail above. For example, the device may send one or more probe packets along the network path, to gather metrics regarding the path (e.g., the amount of jitter, delays, etc. along the path).

At step 1220, the path characteristics that were probed in step 1215 are received, as detailed above. For example, the probing device may receive a calculated amount of delay from the probe packet (e.g., the device that received the probe may determine the time difference between when the probe was received and when the probe was sent).

At step 1225, a potential network attack is detected based on the received path characteristics, as described in greater detail above. In particular, if the probed characteristics do not support the TCA, this may indicate that the TCA was part of a network attack. Procedure 1200 then ends at step 1230.

Figure 13:
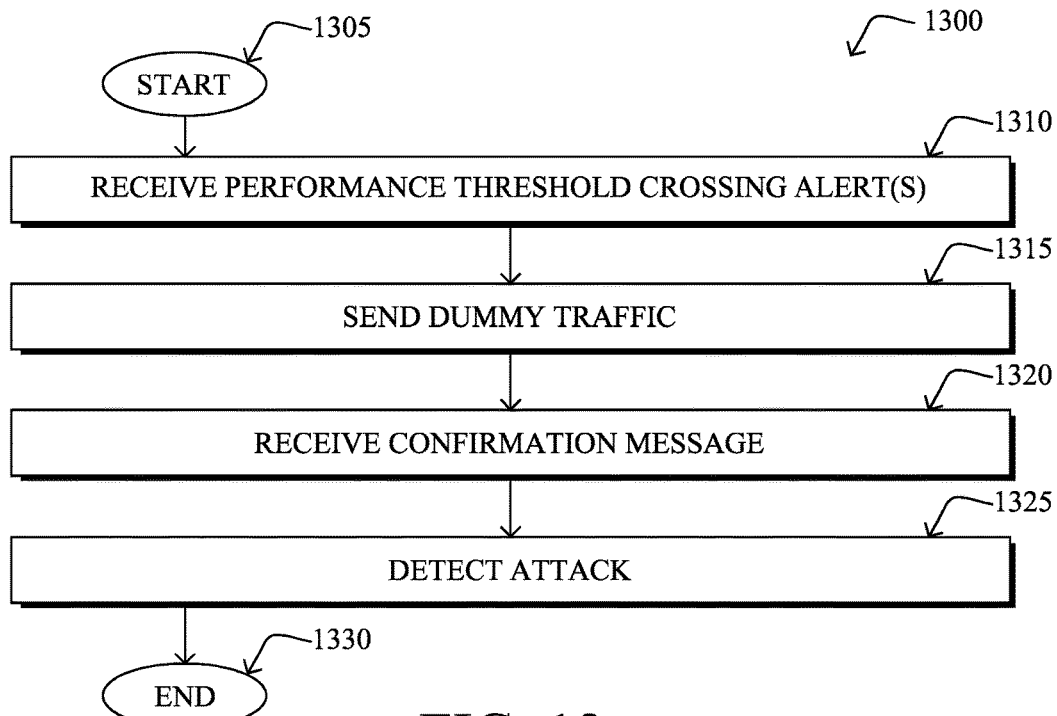
FIG. 13 illustrates an example simplified procedure for detecting a reflection-based based network attack by sending dummy traffic along a communication path.

FIG. 13 illustrates an example simplified procedure for detecting a reflection-based based network attack by sending dummy traffic along a communication path in accordance with one or more embodiments described herein. The procedure 1300 may start at step 1305, and continues to step 1310, where, as described in greater detail above, one or more TCAs may be received by a device in the network. The TCAs may be received, for example, to initiate a path change as part of a performance routing mechanism used in the network.

At step 1315, dummy traffic may be sent along a given network path in response to receiving a TCA for the path, as described in greater detail above. In particular, the dummy traffic may be traffic that includes any or all of the CoS information associated with the TCA except the payload. Such traffic may be sent, for example, along the path and directed towards the device that sent the TCA.

At step 1320, a confirmation message is received form the device that originated the TCA, as described in greater detail above. In some embodiments, the confirmation message may be a copy of the dummy traffic sent in step 1315. In such a case, no control data would be included in the payload, thereby preventing an eavesdropper from being able to modify the validation signals. In other embodiments, the confirmation message may be an explicit message that indicates whether or not the sending device actually generated the corresponding TCA.

At step 1325, a network attack is detected, as discussed above. In some cases, if a confirmation message is not received in step 1325 (e.g., after the passage of a certain amount of time), this may indicate to the device that a particular TCA was not sent by the device on the other side of the path. In other embodiments, the other device may send an explicit message that denies sending the TCA. Procedure 1300 then ends at step 1330.

Figure 14:
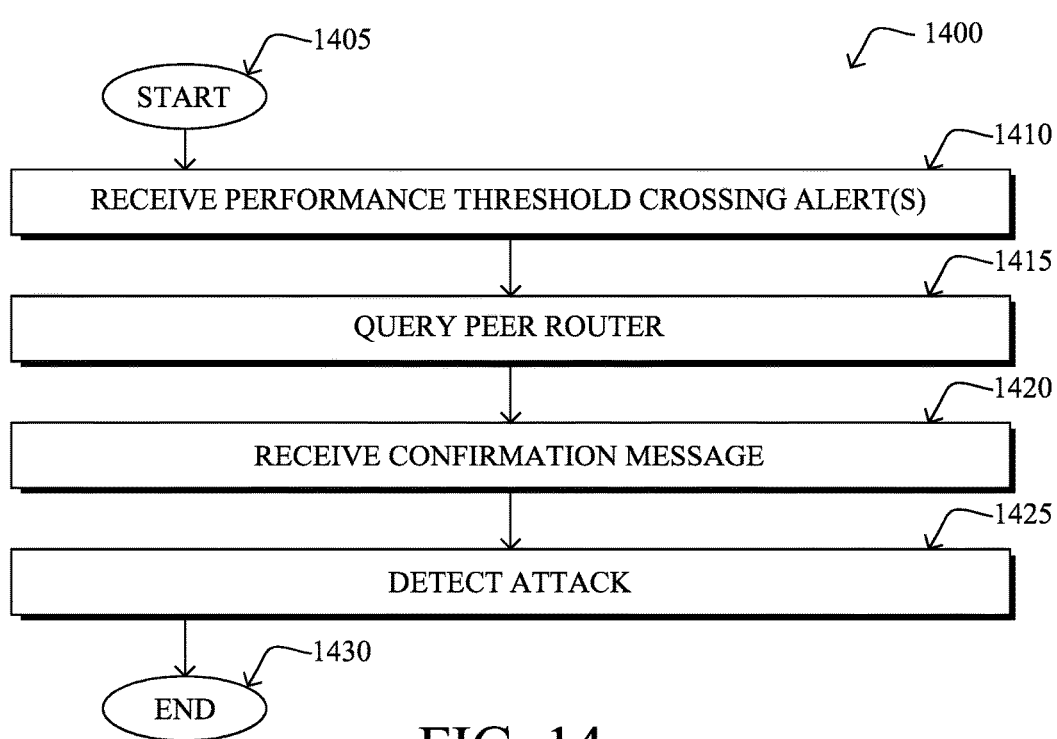
FIG. 14 illustrates an example simplified procedure for detecting a reflection-based network attack by having a peer device confirm or deny a TCA.

FIG. 14 illustrates an example simplified procedure for detecting a reflection-based network attack by having a peer device confirm or deny a TCA in accordance with one or more embodiments described herein. The procedure 1400 may start at step 1405, and continues to step 1410, where, as described in greater detail above, one or more TCAs are received by a network device (e.g., as part of a performance routing mechanism).

At step 1415, a peer router is queried as to the validity of a particular TCA, as detailed above. In general, a peer router may be any co-located router that uses the same performance routing hub and/or uses the same communication path(s) as the device initiating the query.

At step 1420, as described above, a confirmation message may be received from the other router. Such a message may, for example, indicate whether or not the other router also received a corresponding TCA. If the other router did not receive a corresponding TCA, this may be indicative of the TCA being part of an attempted network attack.

At step 1425, a potential network attack is detected based on the confirmation message received in step 1420, as described in greater detail above. Notably, while only certain devices receiving a TCA may not be fully indicative of a network attack, the frequency and/or distribution of the TCAs across the different devices may be. For example, a time-based analysis may be employed to determine whether or not two peer routers received TCAs at or around the same time. In various cases, polling one or more other routers to detect a potential network attack may make use of a probabilistic model, since it may be possible that the timing, devices, etc. associated with the TCAs may indicate that the TCAs are legitimate. Procedure 1400 then ends at step 1430.

It should be noted that while certain steps within procedures 900-1400 may be optional as described above, the steps shown in FIGS. 9-14 are merely examples for illustration, and certain other steps may be included or excluded as desired. Further, while a particular order of the steps is shown, this ordering is merely illustrative, and any suitable arrangement of the steps may be utilized without departing from the scope of the embodiments herein. Moreover, while procedures 900-1400 are described separately, certain steps from each procedure may be incorporated into each other procedure, and the procedures are not meant to be mutually exclusive.

The techniques described herein, therefore, provide for mitigation against network attacks that seek to make use of a TCA mechanism within a network. In some mitigation approaches, a signed and/or encrypted TCA mechanism may ensure that the TCAs are generated from legitimate entities in the network and that their payload cannot be deciphered. In another approach, a learning machine may track the trend and profile of network characteristics (e.g., the switchovers, jitter, delay, etc.) and correlates them with received TCAs. Using classification techniques, ANNs, or the like, it can then be determined whether the TCA is legitimate or malicious. In yet another approach, peer MCs on other spokes can be contacted, in addition to reporting details of the TCA report. The network conditions may then be correlated with the TCA conditions being reported, to determine with a certain probability the maliciousness of the TCA. In further approaches, once a TCA is received, a train of probes or dummy traffic may be sent out to validate and re-affirm the state of the attribute corresponding to the TCA. Based on the values measured by such a train, the decision to switchover can be overridden and the TCA be deemed malicious.

While there have been shown and described illustrative embodiments that provide for dynamic enabling of routing devices in a network, it is to be understood that various other adaptations and modifications may be made within the spirit and scope of the embodiments herein. In addition, while certain protocols are shown, other suitable protocols may be used, accordingly.

The foregoing description has been directed to specific embodiments. It will be apparent, however, that other variations and modifications may be made to the described embodiments, with the attainment of some or all of their advantages. For instance, it is expressly contemplated that the components and/or elements described herein can be implemented as software being stored on a tangible (non-transitory) computer-readable medium (e.g., disks/CDs/RAM/EEPROM/etc.) having program instructions executing on a computer, hardware, firmware, or a combination thereof. Accordingly this description is to be taken only by way of example and not to otherwise limit the scope of the embodiments herein. Therefore, it is the object of the appended claims to cover all such variations and modifications as come within the true spirit and scope of the embodiments herein.

What is claimed is:

1. A method, comprising:
   routing, by a network device, traffic along a network path;
   receiving, at the network device, a performance threshold crossing alert regarding performance of the network path;
   analyzing, at the network device, the performance threshold crossing alert to detect whether the performance threshold crossing alert is part of a potential network attack, wherein the analysis validates the performance threshold crossing alert to distinguish performance threshold crossing alerts from legitimate entities from performance threshold crossing alerts from malicious entities, wherein detecting that the performance threshold crossing alert is part of a potential network attack comprises:
      querying, by the network device, whether the performance threshold crossing alert was also received by a second network device, wherein the second network device routes traffic along a second network path and the network device and the second network device are co-located; and
      receiving, from the second device, a notification that confirms that the alert is part of an attempted attack;
   when the analysis results in the performance crossing threshold crossing alert being from a malicious entity, transmitting, by the network device, a notification that a network attack has been detected, wherein the notification includes the performance threshold crossing alert from the malicious entity; and
   mitigating, by the network device, the network attack based on the performance threshold crossing alert in the notification.

2. The method as in claim 1, wherein detecting that the performance threshold crossing alert is part of a potential network attack comprises:
   predicting, by the network device, a probability of receiving the performance threshold crossing alert, wherein the potential network attack is detected based on the predicted probability of receiving the performance threshold crossing alert.

3. The method as in claim 1, wherein the performance threshold crossing alert correspond to an amount of jitter or delays along the network path.

4. An apparatus, comprising:
   one or more network interfaces to communicate with a network;
   a processor coupled to the network interfaces and configured to execute one or more processes; and
   a memory configured to store a process executable by the processor, the process when executed operable to:
      route traffic along a network path;
      receive a performance threshold crossing alert regarding performance of the network path;
      analyze the performance threshold crossing alert to detect whether the performance threshold crossing alert is part of a potential network attack, wherein the analysis validates the performance threshold crossing alert to distinguish performance threshold crossing alerts from legitimate entities from performance threshold crossing alerts from malicious entities, wherein detecting that the performance threshold crossing alert is part of a potential network attack comprises:
         querying, by the apparatus, whether the performance threshold crossing alert was also received by a second network device, wherein the second network device routes traffic along a second network path and the apparatus and the second network device are co-located; and
      receiving, from the second device, a notification that confirms that the alert is part of an attempted attack;
      when the analysis results in the performance threshold crossing alert being from a malicious entity, transmit a notification that a network attack has been detected, wherein the notification includes the performance threshold crossing alert from the malicious entity; and mitigate the network attack based on the performance threshold crossing alert in the notification.

5. The apparatus as in claim 4, wherein the potential network attack is detected by:
predicting a probability of receiving the performance threshold crossing alert, wherein the potential network attack is detected based on the predicted probability of receiving the performance threshold crossing alert.

6. The apparatus as in claim 4, wherein the performance threshold crossing alert corresponds to an amount of jitter or delays along the network path.

7. The apparatus as in claim 4, wherein the potential network attack is detected by:
receiving, from the user interface device, a notification that confirms that the alert is part of an attempted attack.

8. A tangible, non-transitory, computer-readable media having software encoded thereon, the software when executed by a processor in a network device operable to:
route traffic along a network path;
receive a performance threshold crossing alert regarding performance of the network path;
analyze the performance threshold crossing alert to detect whether the performance threshold crossing alert is part of a potential network attack, wherein the analysis validates the performance threshold crossing alert to distinguish performance threshold crossing alerts from legitimate entities from performance threshold crossing alerts from malicious entities, wherein detecting that the performance threshold crossing alert is part of a potential network attack comprises:
querying, by the network device, whether the performance threshold crossing alert was also received by a second network device, wherein the second network device routes traffic along a second network path and the network device and the second network device are co-located; and
receiving, from the second device, a notification that confirms that the alert is part of an attempted attack;
when the analysis results in the performance threshold crossing alert being from a malicious entity, transmit a notification that a network attack has been detected, wherein the notification includes the performance threshold crossing alert from the malicious entity; and
mitigate the network attack based on the performance threshold crossing alert in the notification.

9. The computer-readable media as in claim 8, wherein the software when executed is further operable to:
predict a probability of receiving the performance threshold crossing alert, wherein the potential network attack is detected based on the predicted probability of receiving the performance threshold crossing alert.

10. The computer-readable media as in claim 8, wherein the performance threshold crossing alert corresponds to an amount of jitter or delays along the network path.

* * * * *